US012211392B2

(12) United States Patent
Villa et al.

(10) Patent No.: US 12,211,392 B2
(45) Date of Patent: Jan. 28, 2025

(54) SYSTEMS AND METHODS FOR PROVIDING AIRCRAFT SENSORY CUES

(71) Applicant: Joby Aero, Inc., Santa Cruz, CA (US)

(72) Inventors: Ian Andreas Villa, San Francisco, CA (US); Matthew Derkach, San Francisco, CA (US); Philipp Haban, San Francisco, CA (US); Adam Warmoth, Los Angeles, CA (US); John Conway Badalamenti, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 360 days.

(21) Appl. No.: 17/127,247

(22) Filed: Dec. 18, 2020

(65) Prior Publication Data

US 2021/0201686 A1 Jul. 1, 2021

Related U.S. Application Data

(60) Provisional application No. 62/955,901, filed on Dec. 31, 2019.

(51) Int. Cl.
*G08G 5/02* (2006.01)
*B64D 45/00* (2006.01)
*B64D 47/02* (2006.01)

(52) U.S. Cl.
CPC .............. *G08G 5/025* (2013.01); *B64D 45/00* (2013.01); *B64D 47/02* (2013.01)

(58) Field of Classification Search
CPC ......... B64D 45/00; B64D 47/02; G08G 5/025
See application file for complete search history.

(56) References Cited

U.S. PATENT DOCUMENTS

| 3,035,789 A | 5/1962 | Young |
| 4,022,405 A | 5/1977 | Peterson |

(Continued)

FOREIGN PATENT DOCUMENTS

| EP | 0945841 A1 | 9/1999 |
| EP | 2698749 A1 | 2/2014 |

(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.

(Continued)

*Primary Examiner* — Angela Y Ortiz
*Assistant Examiner* — Torrence S Marunda, II
(74) *Attorney, Agent, or Firm* — Dority & Manning, P.A.

(57) ABSTRACT

Systems and methods for communicating aircraft sensory cues are provided. A method can include obtaining aerial vehicle data and facility data for an aerial portion of a multi-modal transportation service. The method can include determining a plurality of sensory cues indicative of information for the aerial portion of the transportation service such as a safe path across a landing pad of the facility, a seating assignment for a passenger, etc. The method can include communicating sensory data indicative of the plurality of sensory cues to at least one of a facility computing system associated with the facility or an aerial computing system associated with the at least one aerial vehicle. The facility computing system and/or aerial computing system can output the sensory cue(s) to at least one passenger or operator of the aerial portion of the multi-modal transportation service in, for example, the facility's landing area.

22 Claims, 9 Drawing Sheets

(56) References Cited

U.S. PATENT DOCUMENTS

| | | | |
|---|---|---|---|
| 5,823,468 | A | 10/1998 | Bothe |
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,593,215 | B2 | 3/2020 | Villa |
| 10,593,217 | B2* | 3/2020 | Shannon ............... G08G 5/0043 |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,860,115 | B1* | 12/2020 | Tran ....................... G06F 3/0346 |
| 10,890,926 | B2* | 1/2021 | McNair .................. G05D 1/102 |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2010/0079342 | A1 | 4/2010 | Smith et al. |
| 2014/0179535 | A1 | 6/2014 | Stückl et al. |
| 2015/0330797 | A1* | 11/2015 | Shukla ...................... B64F 1/30 |
| | | | 701/533 |
| 2016/0311529 | A1 | 10/2016 | Brotherton-Ratcliffe et al. |
| 2017/0197710 | A1* | 7/2017 | Ma ....................... G08G 5/0013 |
| 2017/0357914 | A1 | 12/2017 | Tulabandhula et al. |
| 2018/0018887 | A1 | 1/2018 | Sharma et al. |
| 2018/0053425 | A1 | 2/2018 | Adler et al. |
| 2018/0216988 | A1 | 8/2018 | Nance |
| 2018/0308366 | A1 | 10/2018 | Goel et al. |
| 2018/0354636 | A1 | 12/2018 | Darnell et al. |
| 2019/0146508 | A1 | 5/2019 | Dean et al. |
| 2019/0221127 | A1 | 7/2019 | Shannon |
| 2019/0316849 | A1 | 10/2019 | Abrego et al. |
| 2020/0055594 | A1* | 2/2020 | Tal ........................... B64C 37/00 |
| 2020/0103922 | A1 | 4/2020 | Nonami et al. |
| 2020/0388166 | A1 | 12/2020 | Rostamzadeh et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

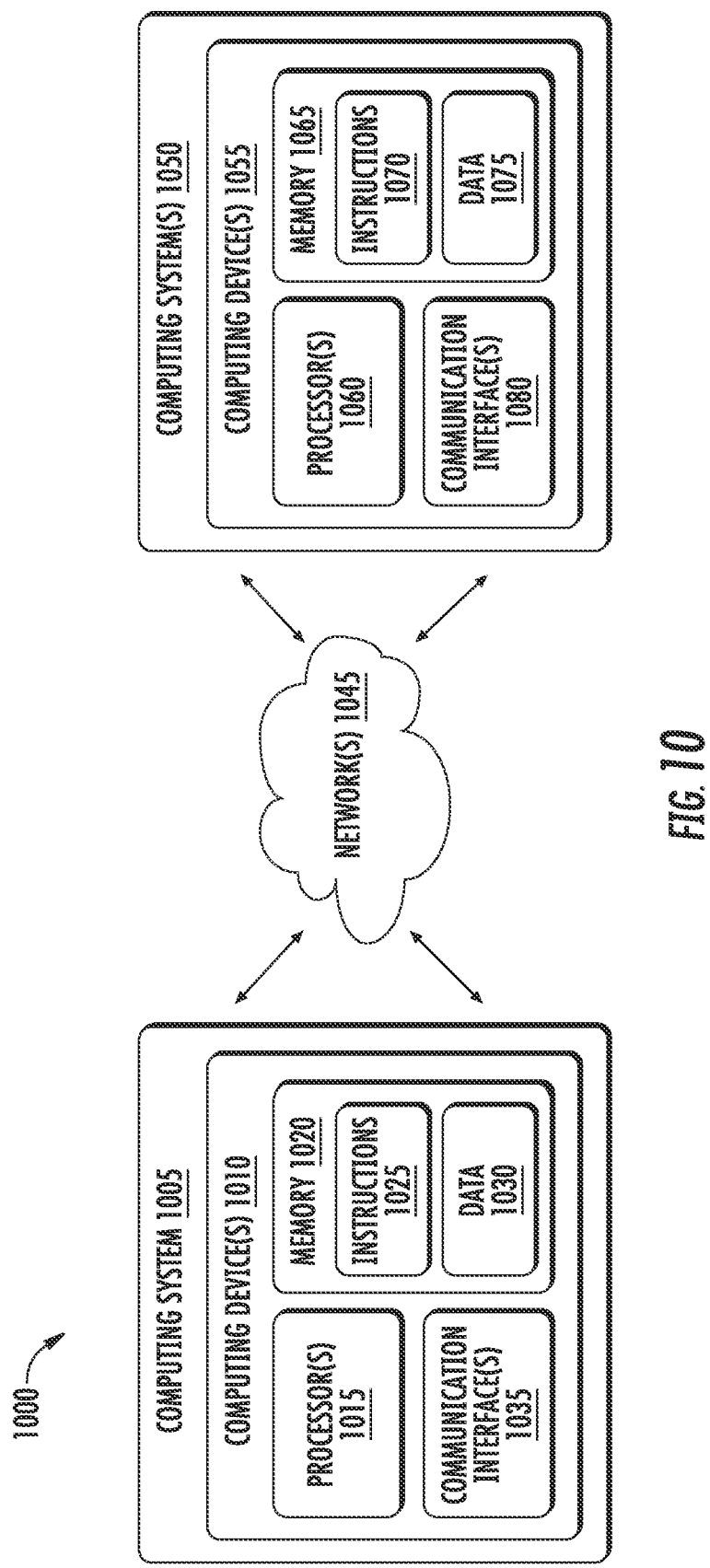

SYSTEMS AND METHODS FOR PROVIDING AIRCRAFT SENSORY CUES

RELATED APPLICATION

The present application is based on and claims benefit of U.S. Provisional Patent Application No. 62/955,901 having a filing date of Dec. 31, 2019, which is incorporated by reference herein.

FIELD

The present disclosure relates generally to aircraft sensory cues for providing information during aerial ridesharing operations.

BACKGROUND

Transportation services applications exist which enable individual users to request transportation on demand. For example, transportation services currently exist which enable drivers of ground-based vehicle (e.g., "cars") to provide transportation services for potential passengers, as well as to deliver packages, goods, and/or prepared foods. However, certain current services are limited to a single transportation modality, namely transportation via cars, bikes, or scooters. As urban areas become increasingly dense, ground infrastructure such as roadways will become increasingly constrained and congested and, as a result, ground-based transportation may not suitably serve the transportation needs of a significant number of users.

SUMMARY

Aspects and advantages of embodiments of the present disclosure will be set forth in part in the following description, or may be learned from the description, or may be learned through practice of the embodiments.

One example aspect of the present disclosure is directed to a computing system including one or one or more processors and one or more tangible, non-transitory, computer readable media that collectively store instructions that when executed by the one or more processors cause the computing system to perform operations. The operations include obtaining multi-modal transportation data associated with a multi-modal transportation service. The multi-modal transportation data includes aerial vehicle data and facility data associated with an aerial portion of the multi-modal transportation service. The aerial vehicle data includes one or more aerial characteristics of one or more aerial vehicles associated with an aerial transportation service for the aerial portion of the multi-modal transportation service. And, the facility data includes one or more facility characteristics of a facility associated with the aerial transportation service. The operations include determining one or more sensory cues indicative of information for the aerial portion of the multi-modal transportation service based, at least in part, on the multi-modal transportation data. And, the operations include communicating sensory data indicative of the one or more sensory cues to at least one of a facility computing system associated with the facility or an aerial computing system associated with an aerial vehicle of the one or more aerial vehicles.

Another example aspect of the present disclosure is directed to a computer-implemented method. The method includes obtaining multi-modal transportation data associated with a multi-modal transportation service. The multi-modal transportation data includes aerial vehicle data and facility data associated with an aerial portion of the multi-modal transportation service. The aerial vehicle data includes one or more aerial characteristics of one or more aerial vehicles associated with an aerial transportation service for the aerial portion of the multi-modal transportation service. And, the facility data includes one or more facility characteristics of a facility associated with the aerial transportation service. The method includes determining one or more sensory cues indicative of information for the aerial portion of the multi-modal transportation service based, at least in part, on the multi-modal transportation data. And, the method includes communicating sensory data indicative of the one or more sensory cues to at least one of a facility computing system associated with the facility or an aerial computing system associated with an aerial vehicle of the one or more aerial vehicles.

Yet another example aspect of the present disclosure is directed to another computing system. The computing system includes one or more output devices comprising at least one visual output device or audio output device. The computing system includes one or more processors. The computing system includes one or more memory devices, the one or more memory devices storing instructions that when executed by the one or more processors cause the computing system to perform operations. The operations include receiving sensory data indicative of the one or more temporary sensory cues. The sensory data includes information for an aerial portion of a multi-modal transportation service, conveyance instructions indicative of a manner in which to convey the information, and temporal instructions indicative of a time to output the information. The operations include associating at least one of the one or more output devices with at least one of the one or more temporary sensory cues based, at least in part, on the conveyance instructions. And, the operations include outputting the at least one temporary sensory cue, via the at least one output device, based, at least in part, on the temporal instructions. The at least one temporary sensory cue is output to one or more passengers of the transportation service to indicate a path along a landing area of an aerial facility to an aerial vehicle located on the landing area of the aerial facility.

Other example aspects of the present disclosure are directed to other systems, methods, vehicles, apparatuses, tangible non-transitory computer-readable media, and devices for generating and communicating aerial vehicle sensory cues.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 10 depicts example system components according to example embodiments of the present disclosure.

DETAILED DESCRIPTION

Figure 1:
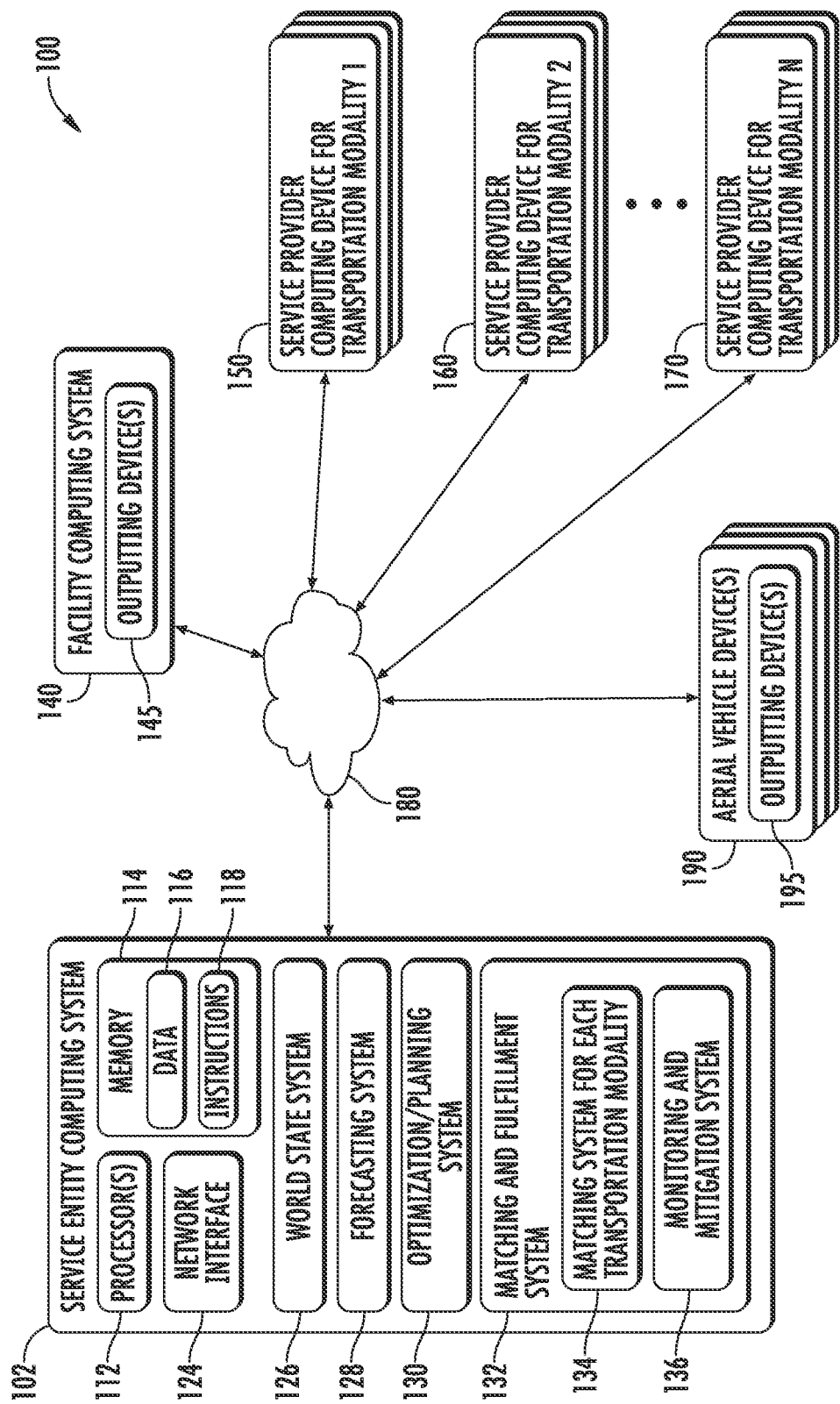
FIG. 1 depicts a block diagram of an example computing system according to example implementations of the present disclosure.

Aspects of the present disclosure are directed to improved systems and methods for conveying aircraft visual cues for improved aerial ridesharing operations. In particular, aspects of the present disclosure are directed to determining and conveying sensory cues to passengers and operators of an aerial service provider. For instance, a service entity can manage and coordinate a plurality of different types of vehicles to provide services to a plurality of users. By way of example, a user may generate a service request for transportation from an origin location to a destination via an application running on the user's device. An operations computing system associated with the service entity (e.g., a cloud-based operations computing, etc.) can obtain data indicative of the service request and generate a user itinerary to facilitate transporting the user from the origin location to the destination location. The itinerary can be a multi-modal transportation itinerary that includes at least two types of transportation such as, for example, ground-based vehicle transportation and aerial transportation. For example, the itinerary can include three legs: a first leg that includes a ground-based vehicle transporting a user from the origin location (e.g., a home, etc.) to a first aerial transport facility; a second leg (e.g., an aerial portion) that includes an aerial vehicle transporting the user from the first aerial transport facility to a second aerial transport facility; and a third leg that includes another ground-based vehicle transportation the user from the second aerial transport facility to the destination location (e.g., a conference center). The aerial transport facilities can include a plurality of aerial vehicles that are arriving and departing at various times for a variety of different users. Moreover, the aerial transport facilities may include dynamic landing/parking configurations to help improve efficiency of the aerial transportation.

In order to help account for the facility landing/parking configurations and decrease aerial vehicle downtime, the systems and methods of the present disclosure provide for the generation and output of dynamic, real-time sensory cues that help improve the efficiency of user ingress and egress to/from the aerial vehicles in the landing/parking area. For example, the service entity's operations computing system can obtain multi-modal transportation data associated with one or more aerial vehicle(s) (e.g., vertical take-off and landing aircraft (VTOL), etc.) and/or an aerial transport facility (e.g., maintenance facility, aircraft terminal, etc.) associated with the aerial portion of a multi-modal transportation service. The operations computing system can determine sensory cues (e.g., visual, auditory, tactile, etc.) that convey information about the aerial portion of the transportation service based on the multi-modal transportation data and provide sensory data indicative of the sensory cues to computing systems associated with the aerial vehicle and/or facility. By way of example, the operations computing system can analyze the multi-modal transportation data with aerial vehicle(s) to determine when the aerial vehicle(s) will be landing and departing an aerial transport facility and how long the aerial vehicle(s) will be located at the aerial transport facility. The operations computing system can analyze the multi-modal transportation data with an aerial transport facility to determine the layout/configuration of the aerial transport facility (e.g., its FATOs, landing area, parking area(s), charger locations, etc.). The operations computing system can also determine (from the multi-modal transportation data) where the aerial vehicle(s) will be located during a certain time range such as, for example, when a group of users are to board an aerial vehicle for transport and seat assignments for those users.

To help reduce vehicle downtime (e.g., the amount of time the aerial vehicle is not traveling), the operations computing system can determine sensory cues that help these users quickly locate and board an aerial vehicle. For instance, the sensory cues can include temporary visual cues such as one or more colored lights depicting a path (and/or direction orienting sounds) to the aerial vehicle. The path can be a safe path of travel across a landing area of the aerial transport facility to the aerial vehicle that takes into account the physical layout of the landing area, the specific configurations (e.g., shape, size, design, etc.) of any aerial vehicles landing, parked, or taking off from the landing area while the passenger is scheduled to board the aerial vehicle for the aerial transportation service. The operations computing system 405 can also determine visual/audible sensory cues that are indicative of a seating assignment for a passenger of an aerial vehicle.

The operations computing system can communicate sensory data indicative of the sensory cues to the computing system of the aerial transport facility and/or the computing system of the aerial vehicle, which can be configured to output the sensory cues. For example, the sensory data can include conveyance instructions indicating that the computing systems associated with the aerial vehicle and/or facility should convey the seating assignment and the safe path of travel to the passenger of the aerial vehicle by projecting a series of lights (e.g., a visual sensory cue) within the aerial vehicle and across the landing area during the scheduled boarding process. The computing system of the aerial transport facility can receive a portion of the sensory data indicative of the safe path and convey the safe path of travel across the landing area by projecting the series of lights across the landing area (e.g., to illuminate the safe path) during the scheduled boarding operation. The computing system of the aerial vehicle can receive a portion of the sensory data indicative of the seating assignment and convey the seating assignment by projecting a series of lights within the aerial vehicle (e.g., to illuminate the seat identified by the seating assignment) during the scheduled boarding operation. In this way, the systems and methods of the present disclosure can dynamically determine sensory cues to convey information for an aerial portion of a multi-modal transportation service. The sensory cues can be tailored to a specific portion (e.g., a boarding operation, etc.) of the transportation service and/or passenger or operator at the specific portion of the transportation service. This, in turn, can increase the safety and efficiency of aerial transportation services by enabling computing systems to convey highly relevant information to passengers and/or operators of an aerial transportation service in an easily perceivable manner. Moreover, this can reduce the amount of downtime that the aerial vehicle spends idle at an aerial transport facility.

More particularly, as described above, a service entity can be associated with an operations computing system (e.g., a cloud-based operations computing system, etc.) that is configured to manage, coordinate, and dynamically adjust a multi-modal transportation service via a transportation platform. The multi-modal transportation service can include a plurality of transportation legs, one of which (e.g., a second transportation leg) can include an aerial transport of a user. For example, the operations computing system can obtain a request for a transportation service. The request for the transportation service can include at least a request for an aerial transport of a user of the transportation platform. The operations computing system can obtain the request from a user device associated with the first user of the transportation platform.

The request for the transportation service can include an origin location and a destination location. In some instances, unless specified otherwise, the origin of the transportation service can be assumed to be a current location of the first user (e.g., as indicated by location data such as GPS data received from the user device and/or as input by the user). A user can also supply a desired destination (e.g., by typing the destination into a text field which may, for example, provide suggested completed entries while the first user types).

A multi-modal transportation itinerary from the origin location to the destination location can be generated based on the request for the transportation service. The multi-modal transportation itinerary can include a first transportation leg, a second transportation leg, and a third transportation leg between the origin location and the destination location specified in the request. The transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The operations computing system can facilitate the ability of a user to receive transportation on one or more of the transportation legs included in the itinerary. As an example, the operations computing system can interact with a plurality of devices (e.g., one or more service provider devices) to match the user with one or more transportation service providers for each transportation leg of the itinerary. For example, the operations computing system can book or otherwise reserve a seat in, space on, or usage of one or more of the transportation modalities for the user. For example, the request for a transportation service can include at least an aerial transport of the user. In response, the operations computing system can determine an aerial service provider to provide the aerial transport for the user (e.g., book a seat on an aerial vehicle of the aerial service provider, etc.).

For example, in response to a user's request, the operations computing system can utilize one or more algorithms/machine-learned models to generate an itinerary for the user. As an example, in some implementations, the operations computing system can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first). By way of example, the operations computing system can assign a user to an aircraft (e.g., an aerial vehicle) for the middle leg of a three-leg multi-modal itinerary and, then, book a human-driven or autonomous ground-based vehicle for a first leg of the multi-modal itinerary to take the user from an origin location to a first aerial facility (e.g., to board the aircraft such as, for example, at a deployment terminal). At a later time (e.g., while the user is in flight), the operations computing system can book another human-driven or autonomous ground-based vehicle to take the user(s) from a second aerial facility (e.g., a destination terminal) to the specified destination location(s). In this manner, the operations computing system can generate a multi-modal transportation itinerary for facilitating the aerial transportation of the multi-modal transportation service.

For instance, the second transportation leg can include an aerial transport from the first aerial facility (e.g., a deployment aerial facility) to the second aerial facility (e.g., a destination aerial facility). The aerial service provider can include a plurality of aerial vehicles including an aerial vehicle configured to provide the aerial transport. The aerial vehicle can be associated with at least one aerial facility for the aerial transport. By way of example, the aerial vehicle can be parked at an aerial facility at the time of the request for the transportation service, scheduled to park at the facility by the time a user is scheduled to reach the facility, stored at the facility, etc. In addition, or alternatively, the aerial vehicle can be scheduled for maintenance at a facility. For example, in some implementations, the aerial facilities can include an aerial maintenance facility at which one or more operators can inspect and/or repair the aerial vehicle.

One or more users of the transportation service can board and/or depart the aerial vehicle at the aerial facilities. For instance, the one or more users can board the aerial vehicle at the deployment aerial facility (e.g., the first aerial facility) and depart the aerial vehicle at the destination aerial facility (e.g., the second aerial facility). In some implementations, the aerial vehicle and/or the one or more users can be assisted by one or more operators of the aerial vehicle and/or the aerial facility. For example, the aerial vehicle can be associated with a vehicle operator. The vehicle operator, for example, can include a pilot of the aerial vehicle. In some implementations, the aerial vehicles can be autonomous aerial vehicles that can maneuver and navigate without the assistance of a vehicle operator. The aerial vehicles utilized by the service entity for aerial transport can include different types of aerial vehicles. For example, one or more aerial vehicle(s) can be associated with different OEMs, manufacturers, etc. The aerial vehicles can include different configurations (e.g., sizes, shapes, designs, wing/rotor placement, etc.), different charging needs, etc. In addition, or alternatively, the aerial facility can be associated with one or more facility operators. The one or more facility operators can include one or more operators located at an aerial facility to assist in the landing, take-off, parking, maintenance, etc. of the aerial vehicle.

Each aerial facility can include a physical layout indicative of one or more parking, boarding, and/or take-off arrangements. In some implementations, each aerial facility can include the same or similar physical layout as the plurality of aerial facilities. In some implementations, one or more of the aerial facilities can include different physical layouts than the plurality of aerial facilities. Each physical layout can include one or more areas (e.g., landing area, storing area, maintenance area, etc.) designated for one or more activities of the aerial service provider. For example, a physical layout can include a landing area configured to allow for the transfer of passengers to/from a plurality of aerial vehicles associated with the aerial facility. The landing area can include one or more parking locations designated to receive and/or store the plurality of aerial vehicles, one or more boarding areas, and/or one or more take-off areas designated to facilitate the departure of one or more aerial vehicle. The one or more parking locations, boarding areas, and/or take-off areas can include independent portions of the landing area and/or overlapping portions of the landing area. The parking locations, boarding areas, and/or take-off areas can be static and/or can be dynamically determined based on one or more factors. For example, in some implementations, each aerial facility can be associated with a landing/parking/take-off schedule identifying a plurality of different aerial vehicles parked and/or scheduled to park at the aerial facility. The parking schedule can be indicative, for example, of a current and/or future location of each of the plurality of different aerial vehicles within the landing area of the facility. In some implementations, the parking locations, boarding areas, and/or take-off areas of the landing area of the aerial facility can be dynamically determined based on the parking schedule associated with the aerial facility.

The operations computing system can be configured to account for the various factors associated with the aerial transportation portion of a multi-modal transportation service and help aid user access to the aerial vehicles. For example, as further described herein, the operations computing system can take into account the specific layout of an aerial transport facility, the itineraries/schedules of the aerial vehicles/facility, and the various configurations of the aerial vehicles at the facility to generate sensory aids for helping users locate, access, and/or utilize (e.g., transportation, for maintenance, etc.) the aerial vehicle(s). To help do so, the operations computing system can formulate sensory cues that are tailored to these dynamic factors and can be outputted for aiding a user.

As further described herein, sensory cues can be determined that are specific to an aerial portion of a multi-modal transportation service. To do so, the operations computing system (e.g., a sensory computing sub-system, a sensory cue back-end service, etc.) can obtain multi-modal transportation data associated with the aerial portion of the multi-modal transportation service. The operations computing system (e.g., the sensory computing sub-system, the sensory cue back-end service, etc.) can include one or more processor(s) and memory device(s). The one or more memory devices can store instructions that when executed by the one or more processors cause the operations computing system to perform operations. In addition, or alternatively, the operations computing system can include one or more communication interfaces communicatively connected to at least one of the facility computing system and/or the aerial computing system. By way of example, the aerial portion of the multi-modal transportation service can include at least one aerial facility (e.g., a deployment facility, a destination facility, etc.) and at least one aerial vehicle associated with the aerial portion of the multi-modal transportation service. The operations computing system can be communicatively connected to the at least one aerial facility (e.g., via the facility computing system) and/or aerial vehicle (e.g., via the aerial computing system) over one or more networks.

Sensory cues can include visual or auditory cues that may be communicated to a user. Sensory cues can be communicated to the one or more users and/or operators associated with the aerial service provider to convey information about the aerial vehicle and/or an aerial portion of a multi-modal transportation service (e.g., safety information, itinerary information, maintenance info, etc.). For example, the sensory cues can include temporary cues output to one or more users and/or operators associated with the aerial service provider. The temporary sensory cues can convey information about the aerial vehicle and/or the aerial portion of the multi-modal transportation service based on the time and/or circumstances of the transportation service. The temporary sensory cues can be output to the one or more users/operators without leaving any lasting effect on an aerial vehicle and/or an aerial facility associated with the aerial portion of the multi-modal transportation service.

In addition, or alternatively, the operations computing system can determine sensory cues specific to an aerial vehicle inspection. In such a case, the operations computing system can obtain maintenance data associated with the aerial vehicle inspection. The aerial vehicle inspection, for example, can include the aerial vehicle and/or facility.

The multi-modal transportation data (and/or the maintenance data) can include aerial vehicle data and/or facility data. For example, the aerial vehicle data can include information associated with one or more aerial vehicle(s) associated with an aerial transportation service. The one or more aerial vehicle(s) can include, for example, the aerial vehicle configured to provide the aerial transport of a user of an aerial service provider (and/or an aerial vehicle inspected by a maintenance operator). The vehicle data can include one or more aerial characteristics of the one or more aerial vehicle(s) associated with the aerial transportation service. The one or more vehicle characteristics, for example, can include data indicative of a vehicle identification (e.g., an identifier for a respective vehicle), a vehicle operator (e.g., maintenance operator, pilot assigned to the vehicle, etc.), a vehicle size (e.g., physical dimensions, etc.), a vehicle type (e.g., make, model, etc.), a vehicle status (e.g., inbound, parked, etc.), landing requirements (e.g., space needed to safely land), vehicle health (maintenance information such as the condition of one or more mechanical/electrical components of the vehicle), and/or any other characteristics relevant to an aerial vehicle.

The facility data can include information associated with an aerial facility associated with the aerial transportation service (and/or aerial vehicle inspection). The facility data can include, for example, one or more facility characteristics of the facility associated with the aerial portion of the multi-modal transportation service. For example, the one or more facility characteristics can include layout data and/or parking data associated with the facility. The layout data, for example, can be indicative of the physical layout of the facility (e.g., the layout of the landing area, the allocation of parking areas, etc.). The parking data, for example, can be indicative of a current or future location of each of a plurality of different aerial vehicles within a landing area (e.g., as specified by the layout data) of the facility.

By way of example, the multi-modal transportation data can include aerial transfer data indicative of flight itineraries for a plurality of different aerial vehicles at the facility. For instance, the data indicative of the flight itineraries can include a parking schedule indicative of a plurality of departure times and landing times for a plurality of different aerial vehicles within the landing area of the facility. The plurality of departure times and landing times, for example, can be determined by the operations computing system in response to a plurality of requests for multi-modal transportations services. The current and/or future locations of each of the different aerial vehicles can be determined based on the plurality of departure and landing times within the landing area of the facility.

In some implementations, the vehicle data can include one or more aerial characteristics (e.g., vehicle type, size, etc.) for each of the plurality of different aerial vehicles currently parked or scheduled to park within the landing area of the facility. In this manner, the operations computing system can determine the location and/or the space occupied (or to be occupied) by each aerial vehicle parked or scheduled to park within the landing area of the facility. The operations computing system can utilize this information to determine portions of the landing area of the facility that are vacant, occupied, or scheduled to be occupied. For example, the operations computing system can identify the location and vehicle characteristics (e.g., size, shape, landing requirements (e.g., safety buffer distances/offset), wing configurations, etc.) of each aerial vehicle currently parked or scheduled to park within the landing area. The operations computing system can determine the one or more portions of the landing area of the facility based on the location, the size, and/or landing requirements of the plurality of different aerial vehicles. By way of example, occupied portions of the landing area can include portions of the landing area that are occupied by parked aerial vehicles as indicated by the size and location of the parked aerial vehicles. In addition, or alternatively, scheduled to be occupied areas can include portions of the landing area that are scheduled to receive an aerial vehicle as indicated by the landing requirements and scheduled location of the aerial vehicles. The computing system can determine one or more walking areas and/or prohibited areas of the landing area based on the different portions of the landing area. For example, the vacant portions of the landing area can be identified as safe areas and thus suitable walking areas. The occupied and scheduled to be occupied portions can be identified as hazardous areas and thereby identified as prohibited areas unsuitable for walking.

In some implementations, the multi-modal transportation data can include passenger data associated with the multi-modal transportation service. The passenger data can include, for example, data indicative of one or more passenger characteristics associated with a passenger of the multi-modal transportation service. The one or more passenger characteristics can include, for example, data indicative of a passenger name, passenger itinerary information (e.g., a seat assignment for the portion of the aerial transportation service), and/or any other information relevant to a passenger of the aerial portion of the multi-modal transportation service.

In addition, or alternatively, the multi-modal transportation data can include environmental data associated with the multi-modal transportation service. For example, the environmental data can include data indicative of one or more atmospheric (e.g., rain, sleet, snow, wind level, other weather conditions, etc.), lighting conditions (e.g., daybreak, night lighting, etc.), and/or any other information associated with a current environment of the portion of the aerial transportation service.

The operations computing system can determine one or more sensory cues based on the multi-modal transportation data and/or the maintenance data. Each of the one or more sensory cues can include an informational cue perceivable by the human senses. For example, as described herein, the one or more sensory cues can include one or more visual cues, auditory cues, tactile cues, etc. For instance, in some implementations, each of the one or more sensory cues can include a visual cue and/or an auditory cue.

A visual cue, for example, can include a plurality of lights (e.g., projected light emitted from a projection lighting device, light emitted from one or lighting devices, etc.). The plurality of lights can include one or more different colors and/or forms capable of portraying information associated with the aerial portion of the multi-modal transportation service. For example, the plurality of lights can depict human readable information such as, for example, text, pictures, etc. In addition, or alternatively, the plurality of lights can include one or more colors indicative of information for the aerial portion of the multi-modal transportation service. For example, each respective color of the one or more colors can be associated with a predefined meaning. By way of example, a red color can be indicative of danger, whereas a green color can be indicative of safety. In some implementations, the visual cues can include an activation pattern of a plurality of lights projected on at least one of the aerial vehicle or a landing area of the facility. In this manner, the one or more visual cues can be projected on at least one of the aerial vehicle and/or a landing area associated with the facility to convey information to one or more users and/or operators associated with the aerial portion of the multi-modal transportation service.

An auditory cue can include a plurality of sounds (e.g., projected sounds from one or more audio devices). The plurality of sounds can include one or more sounds capable of conveying information associated with the aerial portion of the multi-modal transportation service. For example, the sounds can include directional audio directing a passenger along a path within the landing area of the facility. In addition, or alternatively, the sounds can include one or more words conveying information such as passenger information indicative of a seating assignment for a passenger, safety information for the aerial portion of the multi-modal transportation service, etc. In some implementations, the audio cues can include an activation pattern of a plurality of sounds output within the aerial vehicle and/or at a landing area of the facility. In this manner, the audio cues can be provided to convey information to one or more users and/or operators associated with the aerial portion of the multi-modal transportation service within the aerial vehicle and/or at the landing area of the facility.

For example, the one or more sensory cues can be indicative of information for the aerial portion of the multi-modal transportation service based on the multi-modal transportation data. For instance, in some implementations, the one or more sensory cues can be indicative of one or more safe and/or dangerous conditions on the aerial vehicle and/or aerial facility. By way of example, the one or more sensory cues can be indicative of a path along the landing area for one or more passengers to travel to the aerial vehicle. The operations computing system can determine the path along the landing area for the one or more passengers to travel to the aerial vehicle based at least in part on the multi-modal transportation data (e.g., the vehicle data, the flight itineraries for the plurality of different aerial vehicles at the facility, etc.). The path can indicate, for example, a portion of the landing area in which the one or more passengers are to travel to arrive at the aerial vehicle. For instance, the path can provide a safe distance from each of the plurality of different aerial vehicles. A safe distance, for example, can include safety buffer distances/offset from each of the plurality of different aerial vehicles. The path can indicate, for example, a first portion of the landing area (e.g., a walking area) in which the one or more passengers can safely travel within the landing area and a second portion (e.g., a prohibited area) of the landing area in which the one or more passengers are not to travel (e.g., due to safety) within the landing area. The safe distance can be set based on regulations, vehicle OEMs/manufacturers, etc. and can be accessed by the operations computing system.

In some implementations, the operations computing system can determine the one or more sensory cue(s) based on the path along the landing area. For example, at least one of the one or more sensory cue(s) can be indicative of the path along the landing area (e.g., the first and/or second portions of the landing area). For instance, the operations computing system can determine one or more visual cue(s) indicative of the path along the landing area. By way of example, the one or more visual cue(s) can include a plurality of green lights projected onto the first portion (e.g., the walking area) of the landing area and a plurality of red lights projected onto the second portion (e.g., the prohibited area) of the landing area. In addition, or alternatively, the operations computing system can determine one or more audio cues indicative of the path along the landing area. For example, the one or more audio cues can include one or more directional audio outputs indicative of the path. For instance, a passenger can follow the one or more directional audio outputs to travel along the path to the aerial vehicle.

In addition, or alternatively, at least one of the one or more sensory cues can be indicative of one or more passenger characteristics. For example, the operations computing system can determine one or more visual cues indicative of one or more passenger characteristics relevant to the aerial portion of the multi-modal transportation service. The one or more visual cue(s) can include a plurality of lights projected onto the aerial vehicle and/or the landing area in the form of text indicative of the passenger characteristics. For instance, one or more of the visual cues can include text indicative of the passenger seating assignment, an estimated destination/arrival time, and/or any other information relevant to the passenger for the aerial portion of the transportation service. In addition, or alternatively, the one or more visual cue(s) can include a plurality of lights highlighting one or more portions of the aerial vehicle. For instance, a visual cue can be determined that highlights a seat in the aerial vehicle to convey a seating assignment for a passenger of the aerial vehicle. By way of example, the passenger can be associated with respective color and/or name. A visual cue can include a light projected onto a seat (and/or output from a lighting device of the seat) that includes the respective color and/or name of the passenger to convey that the passenger is assigned to the highlighted seat.

In addition, or alternatively, the operations computing system can determine one or more audio cues indicative of the one or more passenger characteristics. By way of example, the one or more audio cues can include one or more words indicative of the passenger seating assignment, an estimated destination/arrival time, and/or any other information relevant to the passenger for the aerial portion of the transportation service.

In addition, in some implementations, at least one of the one or more sensory cue(s) can be indicative of vehicle characteristics. By way of example, one or more sensory cue(s) can be determined based on maintenance data (e.g., vehicle data indicative of the health of the aerial vehicle). For example, the vehicle data can include data indicative of the respective vehicle's health such as the condition of one or more mechanical/electrical components of the vehicle. The operations computing system can determine one or more visual cues indicative of the health of the aerial vehicle. For example, the one or more visual cues can include one or more light(s) highlighting a portion of the aerial vehicle that requires inspection. For instance, the sensory cues can include a component and/or a color indicative of an inspection level required for the vehicle. By way of example, one or more components can be highlighted by a red light indicating that the one or more components require inspection, one or more components can be highlighted by a green light indicating that the one or more components do not require inspection, and one or more components can be highlighted by a yellow light indicating that the one or more components may require inspection.

In addition, or alternatively, the operations computing system can determine one or more sensory cues based on the environmental data of the multi-modal transportation data. For example, the operations computing system can determine one or more sensory cues indicative of one or more atmospheric or lighting conditions associated with a current environment of the aerial portion of the multi-modal transportation service. In addition, or alternatively, the operations computing system can determine one or more sensory cues that account for the current environment of the aerial portion of the multi-modal transportation service. For example, the operations computing system can determine one or more auditory cues to account for poor lighting conditions (e.g., where the aerial portion of the multi-modal transportation service is during a sunny day that prevents passengers or operators from seeing visual cues). As another example, the operations computing system can determine one or more visual cues to account for poor auditory conditions (e.g., where the aerial portion of the multi-modal transportation service is during a windy day that obscures auditory signals).

In some implementations, the operations computing system can determine a plurality of sensory cues. For example, the operations computing system can determine a plurality of sensory cues that, when provided in concert, can provide a holistic representation of information associated with a portion of the aerial transportation service and/or aerial vehicle inspection.

For example, the operations computing system can determine timing data for each respective sensory cue of the plurality of sensory cues. The timing data, for example, can be indicative of a time period to output the respective sensory cue (i.e., before the vehicle lands, after the vehicle lands, before take-off, etc.). By way of example, the operations computing system can determine timing data to schedule the output of the plurality of sensory cues in a coherent manner. For instance, a first set of the plurality of sensory cues can be indicative of a path along the landing area of the facility to the aerial vehicle and second set of the plurality of sensory cues can be indicative of a seating assignment for one or more passenger(s) of the aerial vehicle. The timing data can include a first time period for the first set of the plurality of sensory cues that is before a second time period for the second set of the plurality of sensory cues. In this manner, the first set of sensory cues indicative of the path can be output while the passengers are travelling to the aerial vehicle and the second set of sensory cues can be output once the passengers arrive at the aerial vehicle.

In some implementations, the timing data can be determined based on one or more event(s) associated with the aerial portion of the multi-modal transportation service. For example, the aerial portion of the multi-modal transportation service can include a plurality of events. By way of example, the plurality of events can be indicative of the aerial vehicle approaching the landing area, the aerial vehicle landing within the landing area, passengers departing the aerial vehicle, passengers boarding the aerial vehicle, the aerial vehicle preparing for take-off, the aerial vehicle taking-off, etc. The operations computing system can determine timing data that associates each sensory cue with one or more of the plurality of events. For instance, the timing data for the plurality of sensory cues can associate a set of sensory cues indicative of a path and/or seating assignment with a boarding event indicating that passengers are boarding the aerial vehicle. In addition, or alternatively, the timing data can associate another set of sensory cues indicating a landing space of an aerial vehicle with a landing event indicating that the aerial vehicle is landing within the landing area (e.g., at the landing space). The sensory cues can be removed and/or outputted based on the events. By way of example, computing system(s) can cease the output of a path for a user once the user has traversed the entire path. The computing system(s) can begin to output the seat assignment cues for the user as the user approaches the vehicle and cease output of the seat assignment cues after the user is seated.

In some implementations, one or more of the plurality of sensory cues can be associated with overlapping time periods. For example, the operations computing system can determine timing data indicative of a time period for each of the plurality of sensory cues. Each time period can be associated with a start time and an end time. In some cases, the start time and the end time of one or more time period(s) can overlap. In such a case, the one or more sensory cue(s) can be output together based on the overlapping time periods. For example, one or more sensory cue(s) indicative of a path across the landing area of the facility can be associated with a time period that overlaps with a time period associated with one or more sensory cue(s) indicative of one or more prohibited portion(s) of the landing area. In this manner, both sets of sensory cues can be output at overlapping times to represent both a walking area (e.g., a safe area to walk across the landing area) and one or more prohibited area(s) (e.g., hazardous areas that are dangerous to walk across).

The operations computing system can employ one or more approaches for determining sensory cue(s). For example, in some implementations, the operations computing system (e.g., the sensory computing subsystem, etc.) can include a database with one or more data structures (e.g., look-up tables, lists, etc.) that indicate the sensory cues that may be available for a given facility and/or aerial vehicle given the set of circumstances indicated by the multi-modal transportation data. The operations computing system can include an optimization function that determines which of the sensory cues would be best based on the multi-modal transportation data. For example, the operations computing system can determine (based on the optimization function) that a visual cue (e.g., a lighted path) may be best in the event that audio cues are already being provided at an aerial transport facility, the facility does not include audio output devices, and/or that the aerial vehicles located at the facility may produce a noise level that would reduce the effectiveness of auditory cues. In some implementations, the operations computing system (e.g., the sensory computing subsystem, etc.) can include heuristics that can be accessed and applied to the set of circumstances indicated by the multi-modal transportation data. In some implementations, the operations computing system (e.g., the sensor computing subsystem, etc.) can include one or more machine-learned models that can be trained to determine one or more sensory cues. For example, the operations computing system can input the multi-modal transportation data (and/or other data) into the machine-learned model(s) (e.g., neural network, etc.). The machine-learned model(s) can determine recommended sensory cue(s) based at least in part on the inputted data. For example, the machine-learned model(s) can output a recommended visual path for user(s) to follow within an aerial transport facility based on the layout of the facility, the aerial vehicles located and/or to be located at the aerial transport facility at a certain time, the itineraries of the various aerial vehicles, the configurations of the aerial vehicles, safety factors (e.g., required buffer distances from rotors, etc.), and/or other information.

The operations computing system can communicate sensory data indicative of the one or more sensory cue(s) to the facility computing system associated with the aerial facility and/or the aerial computing system associated with the aerial vehicle. By way of example, the operations computing system can include one or more communication interface(s) configured to communicate (e.g., via one or more networks such as local area networks, wide area networks, the Internet, secure networks, cellular networks, mesh networks, etc.) with the facility computing system and/or aerial computing system.

An aerial vehicle can be associated with an aerial computing system such as, for example, a vehicle computing system onboard the aerial vehicle. The aerial computing system can include one or more processors and one or more memory devices. The one or more memory devices can store instructions that when executed by the one or more processors cause the aerial computing system to perform operations. In addition, in some implementations, the aerial computing system can include one or more output devices such as, for example, one or more lighting device(s) (e.g., projection lighting device(s), luminaries, etc.) configured to illuminate portions of the aerial vehicle and/or the landing area associated with the facility, one or more auditory device(s) (e.g., speakers, etc.) configured to play one or more sounds at the landing area and/or within the aerial vehicle (e.g., directional audio, etc.), one or more tactile device(s), etc. The one or more output device(s) can be configured to convey one or more sensory cues to passengers and/or operators associated with the aerial vehicle.

In addition, or alternatively, the aerial facility can be associated with a facility computing system. The facility computing system can include one or more processors and one or more memory devices. The one or more memory devices can store instructions that when executed by the one or more processors cause the facility computing system to perform operations. The facility computing system can include one or more device(s) physically located on the aerial facility (e.g., the landing area of the facility). For instance, the aerial computing system can include one or more output devices physically located at or near the landing area of the aerial facility. The output devices can include, for example, one or more lighting device(s) (e.g., projection lighting device(s), luminaries, etc.) configured to illuminate portions of the landing area and/or aerial vehicle, one or more auditory device(s) (e.g., speakers, etc.) configured to play sound at or near the landing area, one or more tactile device(s), etc. The one or more output devices can be configured to convey one or more sensory cues to passengers and/or operators associated with the aerial facility.

The aerial computing system and/or the facility computing system can be configured to output the one or more sensory cue(s). The operations computing system can communicate sensory data indicative of the one or more sensor cue(s) to the facility computing system and the aerial computing system. For example, the operations computing system can communicate data indicative of a first portion of the one or more sensor cue(s) to the facility computing system and a second portion of the one or more sensor cue(s) to the aerial computing system. In this manner, the first portion of the one or more sensor cue(s) can be output from one or more output device(s) associated with the facility computing system and the second portion of the one or more sensory cue(s) can be output from one or more output device(s) associated with the aerial computing system.

For example, the facility computing system can be configured to output one or more visual cue(s) on a surface of the aerial vehicle. By way of example, the one or more lighting device(s) can include one or more light projection device(s) configured to project light onto one or more surface(s). The facility computing system can utilize the one or more light projection device(s) to project the one or more visual cue(s) onto a surface of the aerial vehicle. In addition, or alternatively, the facility computing system can be configured to output the one or more visual cue(s) on a surface of the landing area associated with the aerial facility. For example, the facility computing system can utilize the one or more light projection device(s) to project the one or more visual cue(s) onto the surface of the landing area. In addition, in some implementations, the facility computing system can include one or more landing area lighting device(s) configured to emit light from the landing area and/or one or more landing area audio device(s) configured to produce sound from the landing area. The facility computing system can utilize the one or more landing area lighting device(s) and/or audio device(s) to output the one or more sensory cue(s) identified by the sensory data at the landing area.

As another example, the aerial computing system can be configured to output one or more visual cue(s) on a surface of the aerial vehicle. By way of example, the one or more lighting device(s) can include one or more light projection device(s) configured to project light onto one or more surface(s). The aerial computing system can utilize the one or more light projection device(s) to project the one or more visual cue(s) onto a surface of the aerial vehicle. In addition, or alternatively, the aerial computing system can be configured to output the one or more visual cue(s) on a surface of the landing area associated with the aerial facility. For example, the aerial computing system can utilize the one or more light projection device(s) to project the one or more visual cue(s) onto the surface of the landing area.

In some implementations, the aerial computing system can include one or more in-vehicle lighting device(s) and/or audio device(s) configured to emit light and/or sound from within the vehicle (e.g., from one or more doors, from a passenger seat, etc.). The aerial computing system can utilize the one or more in-vehicle lighting/audio device(s) to output the one or more sensory cue(s) identified by the sensory data.

In some implementations, the sensory data can be indicative of a plurality of sensory cues. The sensory data can include timing data indicating a sensory cue sequence indicative of a time period to output each of the plurality of sensory cues. For example, the plurality of sensor cues can include one or more sensory cue(s) to be output on a schedule (e.g., based on one or more event(s), etc.). The facility and/or aerial computing system(s) can output the plurality of sensory cues in accordance with the schedule. For example, the sensory cue sequence can indicate that a first set of the plurality of sensory cues can be output for a first period of time (e.g., 5, 10, 15 minutes, etc.) and a second set of the plurality of the sensory cues can be output for a second period of time (e.g., 5, 10, 15 minutes) before/after/during the first period of time. The aerial and/or facility computing system(s) can output the first set of sensory cues during the first period of time and the second set of sensory cues during the second period of time.

By way of example, the aerial and/or facility computing system(s) (e.g., the computing system including devices physically located on the aerial vehicle, the computing system including devices physically located on the facility, etc.) can receive sensory data indicative of one or more temporary sensory cue(s). The sensory data, for example, can include information for an aerial portion of a multi-modal transportation service (and/or an aerial vehicle inspection), conveyance instructions (e.g., sensory cue) indicative of a manner in which to convey the information, and temporal instructions (e.g., timing data) indicative of a time to output the information.

The aerial and/or facility computing system(s) can associate at least one of the one or more output device(s) with at least one temporary sensory cue based on the conveyance instructions. For example, the conveyance instructions can be indicative of one or more visual cue(s) and a location for the one or more visual cue(s). The aerial and/or facility computing system(s) can associate one or more lighting device(s) with the one or more visual cue(s) such that the one or more visual cue(s) can be output at the location indicated by the conveyance instructions. As another example, the conveyance instructions can be indicative of one or more audio cue(s) and a location for the one or more audio cue(s). The aerial and/or facility computing system(s) can associate one or more audio device(s) with the one or more audio cue(s) such that the one or more audio cue(s) can be output at the location indicated by the conveyance instructions.

The aerial and/or facility computing system(s) can output the at least one temporary sensory cue (e.g., via the at least one output device indicated by the conveyance instructions) based on the temporal instructions. For example, the temporal instructions can be indicative of the timing data indicating a time period to output each of the one or more temporary sensory cue(s). The aerial and/or facility computing system(s) can output the at least one temporary sensory cue during the time period associated with the at least one temporary sensory cue (e.g., as indicated by the temporal instructions). By way of example, the at least one temporary sensory cue can be indicative of a path along the landing area of the aerial facility to an aerial vehicle location on the landing area of the aerial facility. The aerial and/or facility computing system(s) can output the at least one sensory cue to one or more passenger(s) of the transportation service to indicate the path along the landing area of the aerial facility to the aerial vehicle located on the landing area of the aerial facility.

In some implementations, the sensory cues can be outputted to generate a three-dimensional sensory cue for a user. By way of example, the aerial transport facility and/or aerial vehicle can include one or more output devices that can individually or collectively project a path to the aerial vehicle with one or more light-projection walls. The light-projection walls can indicate the boundaries of the path. The boundaries of the path can help designate the safe/permitted area for the users to travel (e.g., the area/volume inside the walls) and help designate the unsafe/prohibited area for the users to travel (e.g., the area/volume outside the walls).

Example aspects of the present disclosure can provide a number of improvements to computing technology such as, for example, aerial transportation computing technology. For instance, the systems and methods of the present disclosure provide an improved approach for conveying information to passengers and/or operators of an aerial transportation service. For example, a computing system can obtain multi-modal transportation data associated with a multi-modal transportation service. The multi-modal transportation data, for example, can include aerial vehicle data and facility data associated with an aerial portion of the multi-modal transportation service. For example, the aerial vehicle data can include one or more aerial characteristic(s) of one or more aerial vehicle(s) associated with an aerial transportation service for the aerial portion of the multi-modal transportation service, whereas the facility data can include one or more facility characteristic(s) of a facility associated with the aerial transportation service. The computing system can determine one or more sensory cue(s) indicative of information for the aerial portion of the multi-modal transportation service based, at least in part, on the multi-modal transportation data. The computing system can communicate sensory data indicative of the one or more sensory cues to at least one of a facility computing system associated with the facility or an aerial computing system associated with an aerial vehicle of the one or more aerial vehicle(s). The facility computing system and/or the aerial computing system can output the one or more sensory cues indicated by the sensory data to the passengers and/or operators of the transportation service. In this manner, the present disclosure presents an improved computing system that can effectively monitor and convey information of a portion of a transportation service to passengers and/or operators of the transportation service. For example, the computing system employs improved output devices within an aerial and/or facility computing system that can output dynamic sensory cues perceivable by passengers and/or operators. The computing system can accumulate and utilize newly available information such as, for example, aerial vehicle characteristics (e.g., vehicle size, type, etc.) and facility characteristics (e.g., layout data, parking data, etc.) to dynamically determine visual cues for the passengers and operators of the transportation service. In this way, the computing system provides a practical application that enables the computing system to provide temporary visual and/or auditory cues during a portion of a transportation service that are specific to the portion of the transportation service. The computer-implemented techniques disclosed herein result in sensory cues that can change depending on the time and circumstances of an aerial transportation service. Ultimately, this can lead to less aerial vehicle downtime and increase aerial vehicle usage, which can result in a more efficient use of the aerial vehicle's onboard resources (e.g., power resources, processing resources, data resources, etc.).

FIG. 1 depicts a block diagram of an example computing system 100 according to example implementations of the present disclosure. The computing system 100 includes a service entity computing system 102 (e.g., a cloud-based operations computing system, etc.) that can operate to plan and fulfill multi-modal transportation service itineraries. The service entity computing system 102 can be communicatively connected over a network 180 to one or more facility computing system(s) 140, one or more service provider computing devices 150 for a first transportation modality, one or more service provider computing devices 160 for a second transportation modality, one or more service provider computing devices 170 for an Nth transportation modality, and/or one or more aerial vehicle devices 190.

Each of the computing devices 140, 150, 160, 170, 190 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., two modalities can be used).

The service entity computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the service entity computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

In some implementations, the service entity computing system 102 can facilitate the ability of the user to receive transportation on one or more of the transportation legs included in an itinerary. As one example, the service entity computing system 102 can interact with one or more ride-sharing networks to match the user with one or more transportation service providers 150, 160, 170. As another example, the service entity computing system 102 can book or otherwise reserve a seat in, space on, or usage of one or more of the transportation modalities for the user. Additionally, or alternatively, the service entity computing system 102 can simply provide information for options to be provided by one or more third parties for one or more of the transportation legs.

Figure 2:
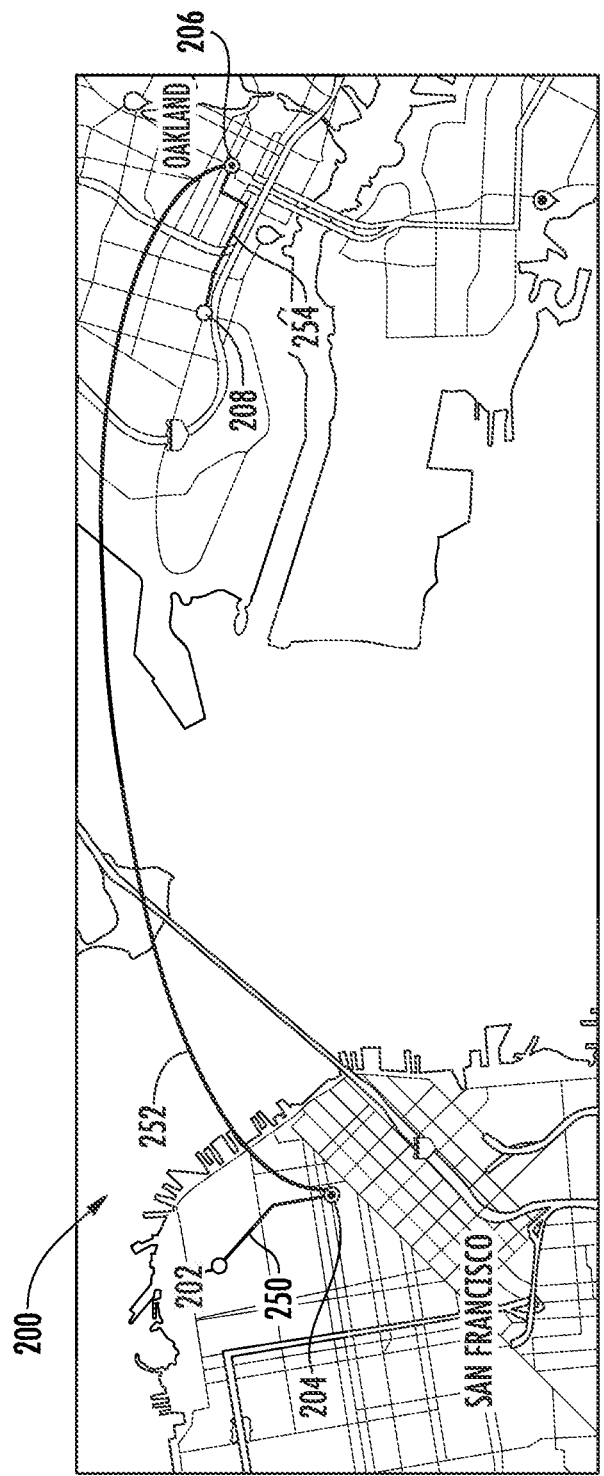
FIG. 2 depicts an example multi-modal transportation itinerary according to example implementations of the present disclosure.

More particularly, the service entity computing system 102 can be associated with a ride sharing service entity and be configured to manage, coordinate, and dynamically adjust a multi-modal transportation service via a transportation platform of the service entity. The multi-modal transportation service can include a plurality of transportation legs, one of which (e.g., a second transportation leg) can include an aerial transport of a user. By way of example, FIG. 2 depicts an example multi-modal transportation itinerary according to example implementations of the present disclosure. The itinerary 200 includes three transportation legs to transport the user from an origin 202 to a destination 208. In particular, the itinerary 200 includes a first, ground-based (e.g., car-based) transportation leg 250 which transports the user from the origin 202 to a departure transportation node 204; a second, flight-based transportation leg 252 which transports the user from the departure transportation node 204 to an arrival transportation node 206; and a third, ground-based (e.g., car-based) transportation leg 254 which transports the user from the arrival transportation node 206 to the destination 208.

Turning back to FIG. 1, the service entity computing system 102 can obtain a request for a transportation service. The request for the transportation service can include at least a request for an aerial transport of a user of a transportation platform. The multi-modal transportation itinerary from the origin location to the destination location can be generated based on the request for the transportation service. The multi-modal transportation itinerary can include a first transportation leg, a second transportation leg, and a third transportation leg between the origin location and the destination location specified in the request. The transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The service entity computing system 102 can respond to a user's request by determining whether it is better to fulfill the user's request using a single transportation modality or using multiple transportation modalities. As one example, the service entity computing system 102 can evaluate the user's current location, request origin, and/or destination to determine which modalities of transportation are usable at such location (e.g., able to access such locations). For example, the location(s) can be checked against a list of white listed locations that have been approved for participation in various types of modalities (e.g., flight modalities for the purpose of generating a multi-modal trip itinerary). As another example, the service entity computing system 102 can evaluate (e.g., generate) one or more itineraries that are single-modal and one or more itineraries that are multi-modal (e.g., inclusive of various combinations of different transportation modalities). The service entity computing system 102 can compare the generated single- and multi-modal itineraries to determine whether it is appropriate to suggest a single- or multi-modal itinerary to the user. For example, one or more of the best itineraries (e.g., as evaluated based on various characteristics such as cost, time, etc.) can be suggested to the user. The user can select one of the suggested itineraries to receive transportation services in accordance with the selected itinerary.

In addition, in some implementations, the service entity computing system 102 can continually reevaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the service entity computing system 102 can suggest the improved itinerary for selection by the user. In some implementations, if the user selects the improved itinerary during completion of an existing itinerary, the service entity computing system 102 can facilitate switching to the updated itinerary, including, for example, rerouting a transportation provider that is currently transporting the user to an alternative, updated destination.

In some implementations, the service entity computing system 102 can include and implement logic for handling transportation service provider cancellations and/or inappropriate usage (e.g., "gaming") of the ride sharing network by the transportation service provider. As one example, in the event of a service provider cancellation or if the service provider is not making substantial progress toward fulfilling the requested, the service entity computing system 102 can automatically prompt a rehandling of the user's request (e.g., rematch to a different service provider but using the same itinerary). Alternatively, or additionally, the service entity computing system 102 can automatically create a new request and perform the itinerary creation process an additional time (e.g., in the case that leg(s) of the original itinerary are accepted by a matched service provider but not fulfilled).

In addition, or alternatively to service provider cancellations, the service entity computing system 102 can include and implement logic for handling user cancellations. As one example, if the user cancels the transportation request/itinerary prior to the scheduled time of pickup and/or actual pickup for the initial transportation leg, the service entity computing system 102 can cancel the entire trip/itinerary. As another example, if a transportation service provider has already been matched for the initial leg, a first cancellation by the user can be treated as a request to rematch the user for the initial transportation leg. A second cancellation by the user can then result in the entire trip/itinerary being cancelled. This logic which interprets the first cancellation as a rematch request avoids cancelling the entire trip when the user is simply cancelling the match with the first service provider because the first service provider is not making substantial progress toward completing the transportation service (e.g., service provider's vehicle is not moving toward the pickup location).

According to another aspect of the present disclosure, in some implementations and scenarios, the service entity computing system 102 can disable the ability of a transportation service provider to contact the user. In particular, one possible scenario is that the user is currently being transported via flight-based transportation. During flight, the user may have been matched with a ground-based transportation provider. The ground-based transportation provider may arrive at the transfer point (e.g., a destination transportation node) in advance of the user's flight and begin contacting the user (e.g., via phone call or text message) asking the user of their location and if the user is ready to engage in the ground-based transportation service. This can be a frustrating or otherwise undesirable experience for the user as the user may feel as though they are delaying the ground-based transportation service provider and/or being rushed by the ground-based transportation service provider but, because they are currently on the flight, the user is unable to take action to reduce the time until the ground-based service can be engaged. Thus, to prevent this scenario, the service entity computing system 102 may disable a ground-based service provider's ability to contact the user if the ground-based service is being provided following a flight-based transportation leg and the flight-based transportation leg has not yet completed. Once the flight-based transportation leg has completed, the service provider may be reenabled to contact the user. In some implementations, the service entity computing system 102 can provide the user with status updates to keep the user informed despite disabling the service provider's ability to contact the user (e.g., "John has arrived and is ready to take you to your destination"). In some implementations, the service entity computing system 102 can provide the service provider with status updates to keep the service provider informed despite disabling the service provider's ability to contact the user (e.g., "Jane's flight is delayed by 5 minutes" or "Jane's flight will arrive in 7 minutes").

In some implementations, the service entity computing system 102 can perform one or more mitigation processes or routines to mitigate failure of one or legs of transportation in a multi-leg transportation itinerary. As one example, a mitigation process implemented by the service entity computing system 102 can include and implement logic for responding to cancellations of flights on which a user is booked. As one example, if a planned flight is cancelled and the user has not yet initiated the itinerary or a threshold period before initiation of the itinerary has not yet been reached, then the service entity computing system 102 can cancel the entire trip/itinerary. The user can be notified of the cancellation and given an opportunity to resubmit the request for transportation. However, if the user has already initiated the itinerary or a threshold period before initiation of the itinerary has been entered, the service entity computing system 102 can notify the user and offer to reroute (e.g., replan the trip with updated information, rematch for the transportation leg with an alternative service provider, and/or change that transportation leg to an alternative transportation modality) the user. In some implementations, the rerouting operations can be given preference or preferential treatment (e.g., the user's use of a luxury modality may be subsidized or reduced-fare).

In some implementations, when a multi-modal itinerary has been completed, the service entity computing system 102 can provide the user with a single receipt. The single receipt can detail respective portions of the final cost associated with each of the multiple legs of transportation. The service entity computing system 102 can generate the single receipt by generating multiple receipts respectively for the multiple transportation legs and then stitching the multiple receipts to generate the single receipt.

The service entity computing system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the service entity computing system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted rider demand; predicted service provider supply; predicted weather conditions; planned itineraries; predetermined transportation plans (e.g., flight plans) and assignments; current requests; current ground transportation service providers; current transportation node operational statuses (e.g., including recharging or refueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the facility computing system 140 or devices 150, 160, 170, 190. For example, facility computing system 140 can provide current information about aerial transportation facilities (e.g., status of infrastructure and associated operations/management thereof), devices 150, 160, and 170 can provide current information about service providers and devices 190 can provide current information about aerial vehicles.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple rideshare networks.

The optimization/planning system 130 can generate transportation plans for various transportation assets and/or can generate itineraries for riders. For example, the optimization/planning system 130 can perform flight planning. As another example, optimization/planning system 130 can plan or manage/optimize itineraries which include interactions between riders and service providers across multiple modes of transportation.

The matching and fulfillment system 132 can match a rider with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 150, 160, 170, and 190. For example, riders, service providers, operations personnel, and/or aerial devices can be alerted when a certain transportation plan has been modified and can be provided with an updated plan/course of action. Thus, the monitoring and mitigation system 136 can have additional control over the movement of aircraft, ground vehicles, pilots, and riders.

In some implementations, the service entity computing system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

In some instances, the service provider computing devices 150, 160, 170 and/or aerial vehicle device(s) can be associated with autonomous vehicles. Thus, the service provider computing devices 150, 160, 170 can provide communication between the service entity computing system 102 and an autonomy stack of the autonomous vehicle which autonomously controls motion of the autonomous vehicle. By way of example, an aerial vehicle can be associated with an aerial vehicle device 190 such as, for example, a vehicle computing system onboard the aerial vehicle. The aerial vehicle device(s) 190 can include one or more processors and one or more memory devices. The one or more memory devices can store instructions that when executed by the one or more processors cause the aerial computing system to perform operations.

In addition, in some implementations, the aerial vehicle device(s) 190 can include one or more output device(s) 195 such as, for example, one or more lighting device(s) (e.g., projection lighting device(s), luminaries, etc.) configured to illuminate portions of the aerial vehicle and/or the landing area associated with the facility, one or more auditory device(s) (e.g., speakers, etc.) configured to play one or more sounds at the landing area and/or within the aerial vehicle (e.g., directional audio, etc.), one or more tactile device(s), etc. The one or more output device(s) 195 can be configured to convey one or more sensory cues to passengers and/or operators associated with the aerial vehicle. The output device(s) 195 can be configured to convey transportation information associated with a user or transportation facility. The one or more output device(s) 195 can include any device capable of outputting a sensory cue perceivable by humans. As example, the output device(s) 195 can include visual output device(s) (e.g., projector devices, lighting devices, etc.) configured to provide visual cues (e.g., images, etc.), audio output device(s) (e.g., speakers, microphones, etc.) configured to provide auditory cues, tactile device(s) configured to provide tactile feedback, and/or any other output device.

The facility computing system(s) 140 can be any form of computing systems or devices used by or at the infrastructure and/or operations personnel at an aerial transportation facility including, for example, devices configured to perform passenger security checks, luggage check in/out, recharging/refueling, safety briefings, vehicle check in/out, and/or the like. In some implementations, the facility computing system(s) 140 can include one or more output device(s) 145. For example, an aerial facility can be associated with facility computing system 140. The facility computing system 140 can include one or more processors and one or more memory devices. The one or more memory devices can store instructions that when executed by the one or more processors cause the facility computing system 140 to perform operations. The facility computing system 140 can include one or more device(s) physically located on the aerial facility (e.g., the landing area of the facility). For instance, the aerial computing system 140 can include one or more output device(s) 145 physically located at or near the landing area of the aerial facility. The output device(s) 145 can include, for example, one or more lighting device(s) (e.g., projection lighting device(s), luminaries, etc.) configured to illuminate portions of the landing area and/or aerial vehicle, one or more auditory device(s) (e.g., speakers, etc.) configured to play sound at or near the landing area, one or more tactile device(s), etc. The one or more output device(s) 145 can be configured to convey one or more sensory cues to passengers and/or operators associated with the aerial facility. The one or more output device(s) 145 can be configured to convey transportation information associated with a user or corresponding transportation facility. The one or more output device(s) 145 can include any device capable of outputting a sensory cue perceivable by humans. As example, the output device(s) 145 can include visual output device(s) (e.g., projector devices, lighting devices, etc.) configured to provide visual cues (e.g., images, etc.), audio output device(s) (e.g., speakers, microphones, etc.) configured to provide auditory cues, tactile device(s) configured to provide tactile feedback, and/or any other output device.

Figure 3:
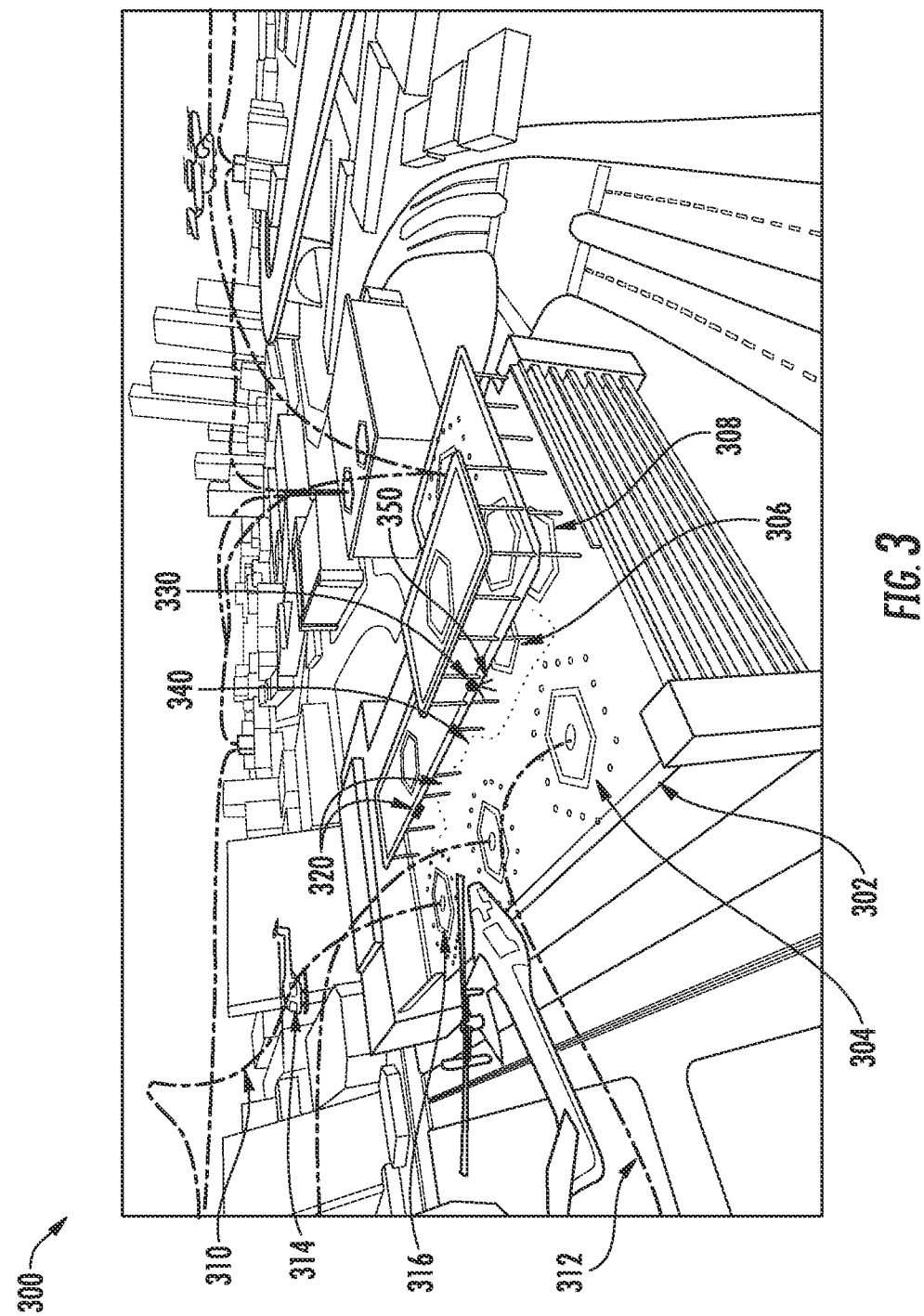
FIG. 3 depicts an example data flow diagram according to example implementations of the present disclosure.

FIG. 3 depicts an example aerial facility 300 according to example implementations of the present disclosure. The example aerial facility 300 can include a landing area 302 with a number of take-off/landing pads such as pads 304, 316. In addition, the example aerial facility 300 can include a number of vehicle parking locations such as parking locations 306 and 308. For example, refueling and/or recharging infrastructure may be accessible at each parking location 306, 308. Flight trajectories 310, 312 into and out of the aerial facility 300 can be defined, configured, assigned, communicated, etc. FIG. 3 illustrates a number of flight trajectories including, for example, trajectories 310 and 312. The trajectories can be fixed or can be dynamically computed. The trajectories can be computed by the aircraft or can be centrally computed and then assigned and communicated to the aircraft. As one example, FIG. 3 illustrates a helicopter 314 taking off from the pad 204 according to the trajectory 212.

In some implementations, the service entity computing system (e.g., service entity computing system 102 of FIG. 1) can be associated with a plurality of aerial facilities. Each aerial facility 300 can include a physical layout indicative of one or more parking 306, 308, boarding 302, 304, 306, 306, and/or take-off arrangements 302, 304. In some implementations, the aerial facility 300 can include the same or similar physical layout as the plurality of aerial facilities. In some implementations, one or more of the aerial facilities can include different physical layouts than the plurality of aerial facilities. Each physical layout can include one or more areas (e.g., landing area 302, storing area 306, 308, maintenance area, etc.) designated for one or more activities of an aerial service provider.

For example, a physical layout can include a landing area 302 configured to allow for the transfer of passengers to/from a plurality of aerial vehicles associated with the aerial facility. The landing area 302 can include one or more parking locations 306, 308 designated to receive and/or store the plurality of aerial vehicles, one or more boarding areas, and/or one or more take-off areas designated to facilitate the departure of one or more aerial vehicle. The one or more parking locations 306, 308, boarding areas, and/or take-off areas can include independent portions of the landing area 302 and/or overlapping portions of the landing area 302. The parking locations 306, 308, boarding areas, and/or take-off areas can be static and/or can be dynamically determined based on one or more factors. For example, in some implementations, each aerial facility 300 can be associated with a landing/parking/take-off schedule identifying a plurality of different aerial vehicles parked and/or scheduled to park at the aerial facility 300. The parking schedule can be indicative, for example, of a current and/or future location of each of the plurality of different aerial vehicles within the landing area 302 of the facility 300.

In some implementations, the parking locations 306, 308, boarding areas, and/or take-off areas of the landing area 302 of the aerial facility 300 can be dynamically determined based on the parking schedule associated with the aerial facility 300. As described in further detail herein, the aerial facility 300 can include one or more output device(s) 320, 330 (e.g., output device(s) 145 of FIG. 1) configured to provide one or more sensory cues 340, 350 indicative of the parking locations 306, 308, boarding areas, and/or take-off areas of the landing area 302 of the aerial facility 300. For example, the output device(s) 320, 330 can include one or more visual output device(s) 320 configured to provide one or more visual cue(s) 340. In addition, or alternatively, the output device(s) 320, 330 can include one or more audio output device(s) 330 configured to provide one or more auditory cue(s) 350.

Figure 4:
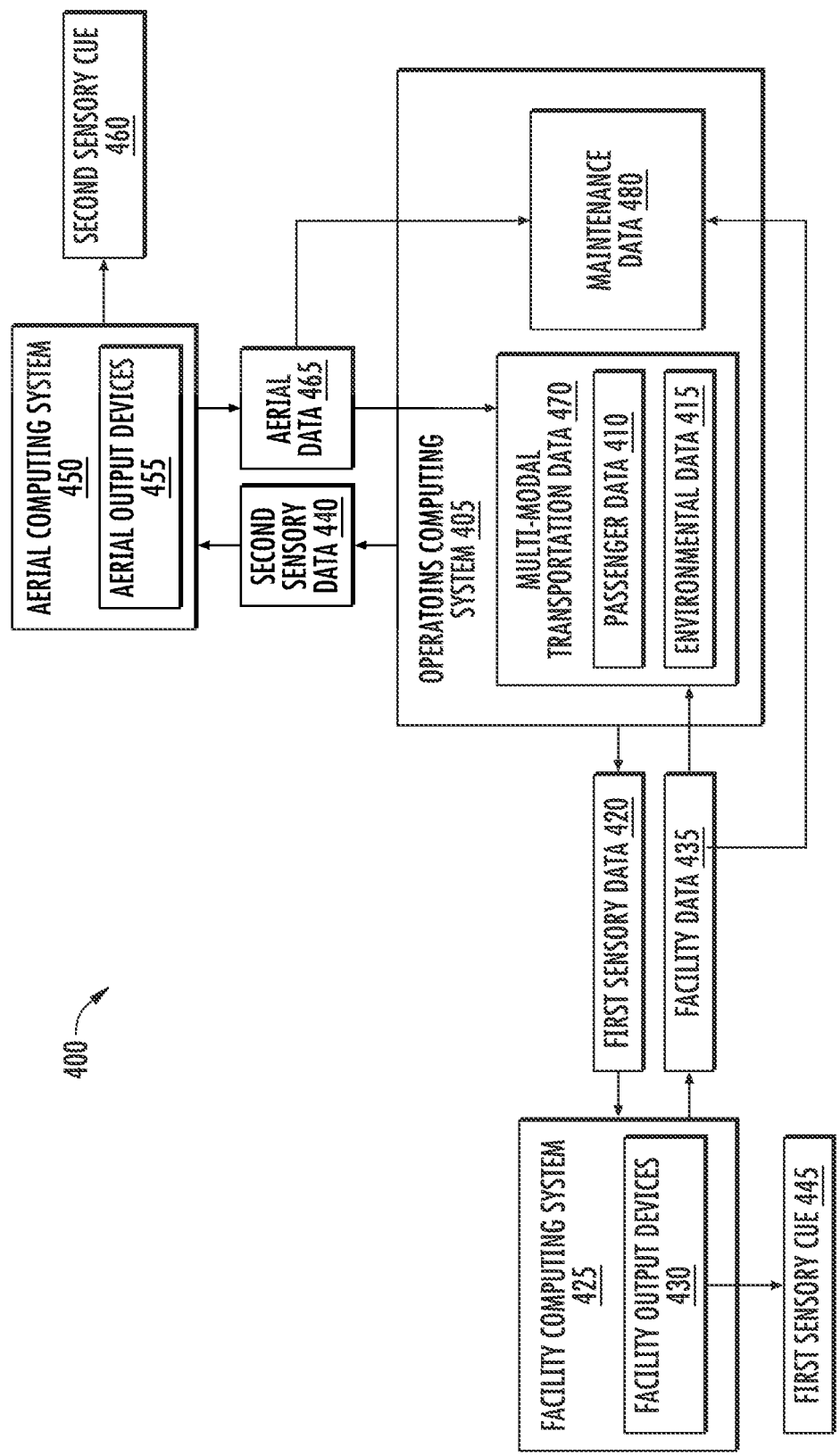
FIG. 4 depicts an example aerial facility layouts according to example implementations of the present disclosure.

FIG. 4 depicts an example data flow diagram 400 for providing visual cues to one or more user(s) of the service entity according to example implementations of the present disclosure. FIG. 4 depicts an operations computing system 405 (e.g., service entity computing system 102), aerial computing system 450 (e.g., aerial vehicle device(s) 190), and a facility computing system 425 (e.g., facility computing system(s) 140). The operations computing system 405 can facilitate the ability of a user to receive transportation on one or more transportation legs included in a multi-modal transportation itinerary. For instance, operations computing system 405 can be configured to account for the various factors associated with the aerial transportation portion of a multi-modal transportation service and help aid user access to the aerial vehicles associated with the aerial transportation portion. For example, the operations computing system 405 can take into account the specific layout of an aerial transport facility (e.g., facility 300 of FIG. 3), the itineraries/schedules of the aerial vehicles/facility, and/or the various configurations of the aerial vehicles at the facility to generate sensory aids for helping users locate, access, and/or utilize (e.g., transportation, for maintenance, etc.) the aerial vehicle(s). To help do so, the operations computing system 405 can formulate sensory cues (e.g., first sensory cue 445, second sensory cue 460, etc.) that are tailored to these dynamic factors and can be outputted for aiding a user.

Sensory cues can be determined that are specific to an aerial portion of a multi-modal transportation service. The operations computing system 405 (e.g., a sensory computing sub-system, a sensory cue back-end service, etc. of the service entity computing system 102) can obtain multi-modal transportation data 470 (e.g., passenger data 410, environmental data 415, facility data 435, aerial data 465, etc.) associated with the aerial portion of the multi-modal transportation service. For example, (although not depicted within FIG. 4) the operations computing system 405 can include one or more communication interfaces communicatively connected to at least one of the facility computing system 425 and/or the aerial computing system 450. By way of example, the aerial portion of the multi-modal transportation service can include at least one aerial facility (e.g., a deployment facility, a destination facility, etc.) and at least one aerial vehicle associated with the aerial portion of the multi-modal transportation service. The operations computing system 405 can be communicatively connected to the at least one aerial facility (e.g., via the facility computing system 425) and/or aerial vehicle (e.g., via the aerial computing system 450) over one or more networks.

As discussed with reference to FIG. 3, the sensory cues (e.g., first and second sensory cue(s) 445, 460) can include visual or auditory cues that may be communicated to a user. Sensory cues can be communicated to the one or more users and/or operators associated with the aerial service provider to convey information about the aerial vehicle and/or an aerial portion of a multi-modal transportation service (e.g., safety information, itinerary information, maintenance info, etc.). For example, the sensory cues can include temporary cues output to one or more users and/or operators associated with the aerial service provider. The temporary sensory cues can convey information about the aerial vehicle and/or the aerial portion of the multi-modal transportation service based on the time and/or circumstances of the transportation service. The temporary sensory cues can be output to the one or more users/operators without leaving any lasting effect on an aerial vehicle and/or an aerial facility associated with the aerial portion of the multi-modal transportation service.

In addition, or alternatively, the operations computing system 405 can determine sensory cues specific to an aerial vehicle inspection. In such a case, the operations computing system 405 can obtain maintenance data 480 (e.g., aerial data 465, facility data 435, etc.) associated with the aerial vehicle inspection. The aerial vehicle inspection, for example, can include the aerial vehicle and/or facility.

The multi-modal transportation data 470 (and/or the maintenance data 480) can include aerial vehicle data 465 and/or facility data 435. For example, the aerial vehicle data 465 can include information associated with one or more aerial vehicle(s) associated with an aerial transportation service. The one or more aerial vehicle(s) can include, for example, the aerial vehicle configured to provide the aerial transport of a user of an aerial service provider (and/or an aerial vehicle inspected by a maintenance operator). The aerial vehicle data 465 can include one or more aerial characteristics of the one or more aerial vehicle(s) associated with the aerial transportation service. The one or more vehicle characteristics, for example, can include data indicative of a vehicle identification (e.g., an identifier for a respective vehicle), a vehicle operator (e.g., maintenance operator, pilot assigned to the vehicle, etc.), a vehicle size (e.g., physical dimensions, etc.), a vehicle type (e.g., make, model, etc.), a vehicle status (e.g., inbound, parked, etc.), landing requirements (e.g., space needed to safely land), vehicle health (maintenance information such as the condition of one or more mechanical/electrical components of the vehicle), and/or any other characteristics relevant to an aerial vehicle.

The facility data 435 can include information associated with an aerial facility associated with the aerial transportation service (and/or aerial vehicle inspection). The facility data 435 can include, for example, one or more facility characteristics of the facility associated with the aerial portion of the multi-modal transportation service. For example, the one or more facility characteristics can include layout data and/or parking data associated with the facility.

The layout data, for example, can be indicative of the physical layout of the facility (e.g., the layout of the landing area, the allocation of parking areas, etc.). The parking data, for example, can be indicative of a current or future location of each of a plurality of different aerial vehicles within a landing area (e.g., as specified by the layout data) of the facility.

By way of example, the multi-modal transportation data 470 can include aerial transfer data indicative of flight itineraries for a plurality of different aerial vehicles at the facility. For instance, the data indicative of the flight itineraries can include a parking schedule indicative of a plurality of departure times and landing times for a plurality of different aerial vehicles within the landing area of the facility. The plurality of departure times and landing times, for example, can be determined by the operations computing system 405 in response to a plurality of requests for multi-modal transportations services. The current and/or future locations of each of the different aerial vehicles can be determined based on the plurality of departure and landing times within the landing area of the facility.

In some implementations, the aerial vehicle data 465 can include one or more aerial characteristics (e.g., vehicle type, size, etc.) for each of the plurality of different aerial vehicles currently parked or scheduled to park within the landing area of the facility. In this manner, the operations computing system 405 can determine the location and/or the space occupied (or to be occupied) by each aerial vehicle parked or scheduled to park within the landing area of the facility. The operations computing system 405 can utilize this information to determine portions of the landing area of the facility that are vacant, occupied, or scheduled to be occupied. For example, the operations computing system 405 can identify the location and vehicle characteristics (e.g., size, shape, landing requirements (e.g., safety buffer distances/offset), wing configurations, etc.) of each aerial vehicle currently parked or scheduled to park within the landing area. The operations computing system 405 can determine the one or more portions of the landing area of the facility based on the location, the size, and/or landing requirements of the plurality of different aerial vehicles. By way of example, occupied portions of the landing area can include portions of the landing area that are occupied by parked aerial vehicles as indicated by the size and location of the parked aerial vehicles. In addition, or alternatively, scheduled to be occupied areas can include portions of the landing area that are scheduled to receive an aerial vehicle as indicated by the landing requirements and scheduled location of the aerial vehicles. The operations computing system 405 can determine one or more walking areas and/or prohibited areas of the landing area based on the different portions of the landing area. For example, the vacant portions of the landing area can be identified as safe areas and thus suitable walking areas. The occupied and scheduled to be occupied portions can be identified as hazardous areas and thereby identified as prohibited areas unsuitable for walking.

In some implementations, the multi-modal transportation data 470 can include passenger data 410 associated with the multi-modal transportation service. The passenger data 410 can include, for example, data indicative of one or more passenger characteristics associated with a passenger of the multi-modal transportation service. The one or more passenger characteristics can include, for example, data indicative of a passenger name, passenger itinerary information (e.g., a seat assignment for the portion of the aerial transportation service), and/or any other information relevant to a passenger of the aerial portion of the multi-modal transportation service.

In addition, or alternatively, the multi-modal transportation data 470 can include environmental data 415 associated with the multi-modal transportation service. For example, the environmental data 415 can include data indicative of one or more atmospheric (e.g., rain, sleet, snow, wind level, other weather conditions, etc.), lighting conditions (e.g., daybreak, night lighting, etc.), and/or any other information associated with a current environment of the portion of the aerial transportation service.

The operations computing system 405 can determine one or more sensory cue(s) (e.g., sensory cue(s) 445, 460) based on the multi-modal transportation data 470 and/or the maintenance data 480. Each of the one or more sensory cues can include an informational cue perceivable by the human senses. For example, as described herein, the one or more sensory cues can include one or more visual cues, auditory cues, tactile cues, etc. For instance, in some implementations, each of the one or more sensory cues can include a visual cue and/or an auditory cue.

A visual cue, for example, can include a plurality of lights (e.g., projected light emitted from a projection lighting device, light emitted from one or lighting devices, etc.). The plurality of lights can include one or more different colors and/or forms capable of portraying information associated with the aerial portion of the multi-modal transportation service. For example, the plurality of lights can depict human readable information such as, for example, text, pictures, etc. In addition, or alternatively, the plurality of lights can include one or more colors indicative of information for the aerial portion of the multi-modal transportation service. For example, each respective color of the one or more colors can be associated with a predefined meaning. By way of example, a red color can be indicative of danger, whereas a green color can be indicative of safety. In some implementations, the visual cues can include an activation pattern of a plurality of lights projected on at least one of the aerial vehicle or a landing area of the facility. In this manner, the one or more visual cues can be projected on at least one of the aerial vehicle and/or a landing area associated with the facility to convey information to one or more users and/or operators associated with the aerial portion of the multi-modal transportation service.

An auditory cue can include a plurality of sounds (e.g., projected sounds from one or more audio devices). The plurality of sounds can include one or more sounds capable of conveying information associated with the aerial portion of the multi-modal transportation service. For example, the sounds can include directional audio directing a passenger along a path within the landing area of the facility. In addition, or alternatively, the sounds can include one or more words conveying information such as passenger information indicative of a seating assignment for a passenger, safety information for the aerial portion of the multi-modal transportation service, etc. In some implementations, the auditory cues can include an activation pattern of a plurality of sounds output within the aerial vehicle and/or at a landing area of the facility. In this manner, the auditory cues can be provided to convey information to one or more users and/or operators associated with the aerial portion of the multi-modal transportation service within the aerial vehicle and/or at the landing area of the facility.

For example, the one or more sensory cues can be indicative of information for the aerial portion of the multi-modal transportation service based on the multi-modal transportation data 470. For instance, in some implementations, the one or more sensory cues can be indicative of one or more safe and/or dangerous conditions on the aerial vehicle and/or aerial facility. By way of example, the one or more sensory cues can be indicative of a path along the landing area for one or more passengers to travel to the aerial vehicle. The operations computing system 405 can determine the path along the landing area for the one or more passengers to travel to the aerial vehicle based at least in part on the multi-modal transportation data 470 (e.g., the aerial vehicle data 465, the flight itineraries for the plurality of different aerial vehicles at the facility, etc.). The path can indicate, for example, a portion of the landing area in which the one or more passengers are to travel to arrive at the aerial vehicle. For instance, the path can provide a safe distance from each of the plurality of different aerial vehicles. A safe distance, for example, can include safety buffer distances/offset from each of the plurality of different aerial vehicles. The path can indicate, for example, a first portion of the landing area (e.g., a walking area) in which the one or more passengers can safely travel within the landing area and a second portion (e.g., a prohibited area) of the landing area in which the one or more passengers are not to travel (e.g., due to safety) within the landing area. The safe distance can be set based on regulations, vehicle OEMs/manufacturers, etc. and can be accessed by the operations computing system 405.

In some implementations, the operations computing system 405 can determine the one or more sensory cue(s) based on the path along the landing area. For example, at least one of the one or more sensory cue(s) can be indicative of the path along the landing area (e.g., the first and/or second portions of the landing area). For instance, the operations computing system 405 can determine one or more visual cue(s) indicative of the path along the landing area. By way of example, the one or more visual cue(s) can include a plurality of green lights projected onto the first portion (e.g., the walking area) of the landing area and a plurality of red lights projected onto the second portion (e.g., the prohibited area) of the landing area. In addition, or alternatively, the operations computing system 405 can determine one or more auditory cues indicative of the path along the landing area. For example, the one or more auditory cues can include one or more directional audio outputs indicative of the path. For instance, a passenger can follow the one or more directional audio outputs to travel along the path to the aerial vehicle.

In addition, or alternatively, at least one of the one or more sensory cues can be indicative of one or more passenger characteristics. For example, the operations computing system 405 can determine one or more visual cues indicative of one or more passenger characteristics relevant to the aerial portion of the multi-modal transportation service. The one or more visual cue(s) can include a plurality of lights projected onto the aerial vehicle and/or the landing area in the form of text indicative of the passenger characteristics. For instance, one or more of the visual cues can include text indicative of the passenger seating assignment, an estimated destination/arrival time, and/or any other information relevant to the passenger for the aerial portion of the transportation service. In addition, or alternatively, the one or more visual cue(s) can include a plurality of lights highlighting one or more portions of the aerial vehicle. For instance, a visual cue can be determined that highlights a seat in the aerial vehicle to convey a seating assignment for a passenger of the aerial vehicle. By way of example, the passenger can be associated with respective color and/or name. A visual cue can include a light projected onto a seat (and/or output from a lighting device of the seat) that includes the respective color and/or name of the passenger to convey that the passenger is assigned to the highlighted seat.

In addition, or alternatively, the operations computing system 405 can determine one or more auditory cues indicative of the one or more passenger characteristics. By way of example, the one or more auditory cues can include one or more words indicative of the passenger seating assignment, an estimated destination/arrival time, and/or any other information relevant to the passenger for the aerial portion of the transportation service.

In addition, in some implementations, at least one of the one or more sensory cue(s) can be indicative of vehicle characteristics. By way of example, one or more sensory cue(s) can be determined based on maintenance data 480 (e.g., aerial vehicle data 465 indicative of the health of the aerial vehicle). For example, the aerial vehicle data 465 can include data indicative of the respective vehicle's health such as the condition of one or more mechanical/electrical components of the vehicle. The operations computing system 405 can determine one or more visual cues indicative of the health of the aerial vehicle. For example, the one or more visual cues can include one or more light(s) highlighting a portion of the aerial vehicle that requires inspection. For instance, the sensory cues can include a component and/or a color indicative of an inspection level required for the vehicle. By way of example, one or more components can be highlighted by a red light indicating that the one or more components require inspection, one or more components can be highlighted by a green light indicating that the one or more components do not require inspection, and one or more components can be highlighted by a yellow light indicating that the one or more components may require inspection.

In addition, or alternatively, the operations computing system 405 can determine one or more sensory cues based on the environmental data of the multi-modal transportation data 470. For example, the operations computing system 405 can determine one or more sensory cues indicative of one or more atmospheric or lighting conditions associated with a current environment of the aerial portion of the multi-modal transportation service. In addition, or alternatively, the operations computing system 405 can determine one or more sensory cues that account for the current environment of the aerial portion of the multi-modal transportation service. For example, the operations computing system 405 can determine one or more auditory cues to account for poor lighting conditions (e.g., where the aerial portion of the multi-modal transportation service is during a sunny day that prevents passengers or operators from seeing visual cues). As another example, the operations computing system 405 can determine one or more visual cues to account for poor auditory conditions (e.g., where the aerial portion of the multi-modal transportation service is during a windy day that obscures auditory signals).

In some implementations, the operations computing system 405 can determine a plurality of sensory cues. For example, the operations computing system 405 can determine a plurality of sensory cues that, when provided in concert, can provide a holistic representation of information associated with a portion of the aerial transportation service and/or aerial vehicle inspection.

For example, the operations computing system 405 can determine timing data for each respective sensory cue of the plurality of sensory cues. The timing data, for example, can be indicative of a time period to output the respective sensory cue (i.e., before the vehicle lands, after the vehicle lands, before take-off, etc.). By way of example, the operations computing system 405 can determine timing data to schedule the output of the plurality of sensory cues in a coherent manner. For instance, a first set of the plurality of sensory cues can be indicative of a path along the landing area of the facility to the aerial vehicle and second set of the plurality of sensory cues can be indicative of a seating assignment for one or more passenger(s) of the aerial vehicle. The timing data can include a first time period for the first set of the plurality of sensory cues that is before a second time period for the second set of the plurality of sensory cues. In this manner, the first set of sensory cues indicative of the path can be output while the passengers are travelling to the aerial vehicle and the second set of sensory cues can be output once the passengers arrive at the aerial vehicle.

In some implementations, the timing data can be determined based on one or more event(s) associated with the aerial portion of the multi-modal transportation service. For example, the aerial portion of the multi-modal transportation service can include a plurality of events. By way of example, the plurality of events can be indicative of the aerial vehicle approaching the landing area, the aerial vehicle landing within the landing area, passengers departing the aerial vehicle, passengers boarding the aerial vehicle, the aerial vehicle preparing for take-off, the aerial vehicle taking-off, etc. The operations computing system 405 can determine timing data that associates each sensory cue with one or more of the plurality of events. For instance, the timing data for the plurality of sensory cues can associate a set of sensory cues indicative of a path and/or seating assignment with a boarding event indicating that passengers are boarding the aerial vehicle. In addition, or alternatively, the timing data can associate another set of sensory cues indicating a landing space of an aerial vehicle with a landing event indicating that the aerial vehicle is landing within the landing area (e.g., at the landing space). The sensory cues can be removed and/or outputted based on the events. By way of example, computing system(s) can cease the output of a path for a user once the user has traversed the entire path. The computing system(s) can begin to output the seat assignment cues for the user as the user approaches the vehicle and cease output of the seat assignment cues after the user is seated.

In some implementations, one or more of the plurality of sensory cues can be associated with overlapping time periods. For example, the operations computing system 405 can determine timing data indicative of a time period for each of the plurality of sensory cues. Each time period can be associated with a start time and an end time. In some cases, the start time and the end time of one or more time period(s) can overlap. In such a case, the one or more sensory cue(s) can be output together based on the overlapping time periods. For example, one or more sensory cue(s) indicative of a path across the landing area of the facility can be associated with a time period that overlaps with a time period associated with one or more sensory cue(s) indicative of one or more prohibited portion(s) of the landing area. In this manner, both sets of sensory cues can be output at overlapping times to represent both a walking area (e.g., a safe area to walk across the landing area) and one or more prohibited area(s) (e.g., hazardous areas that are dangerous to walk across).

The operations computing system 405 can employ one or more approaches for determining sensory cue(s). For example, in some implementations, the operations computing system 405 (e.g., the sensory computing subsystem, etc.) can include a database with one or more data structures (e.g., look-up tables, lists, etc.) that indicate the sensory cues that may be available for a given facility and/or aerial vehicle given the set of circumstances indicated by the multi-modal transportation data 470. The operations computing system 405 can include an optimization function that determines which of the sensory cues would be best based on the multi-modal transportation data 470. For example, the operations computing system 405 can determine (based on the optimization function) that a visual cue (e.g., a lighted path) may be best in the event that auditory cues are already being provided at an aerial transport facility, the facility does not include audio output devices, and/or that the aerial vehicles located at the facility may produce a noise level that would reduce the effectiveness of auditory cues. In some implementations, the operations computing system 405 (e.g., the sensory computing subsystem, etc.) can include heuristics that can be accessed and applied to the set of circumstances indicated by the multi-modal transportation data 470. In some implementations, the operations computing system 405 (e.g., the sensor computing subsystem, etc.) can include one or more machine-learned models that can be trained to determine one or more sensory cues. For example, the operations computing system 405 can input the multi-modal transportation data 470 (and/or other data) into the machine-learned model(s) (e.g., neural network, etc.). The machine-learned model(s) can determine recommended sensory cue(s) based at least in part on the inputted data. For example, the machine-learned model(s) can output a recommended visual path for user(s) to follow within an aerial transport facility based on the layout of the facility, the aerial vehicles located and/or to be located at the aerial transport facility at a certain time, the itineraries of the various aerial vehicles, the configurations of the aerial vehicles, safety factors (e.g., required buffer distances from rotors, etc.), and/or other information.

The operations computing system 405 can communicate sensory data 420, 440 indicative of the one or more sensory cue(s) to the facility computing system 425 associated with the aerial facility and/or the aerial computing system 450 associated with the aerial vehicle. By way of example, the operations computing system 405 can include one or more communication interface(s) configured to communicate (e.g., via one or more networks such as local area networks, wide area networks, the Internet, secure networks, cellular networks, mesh networks, etc.) with the facility computing system 425 and/or aerial computing system 450.

The aerial computing system 450 and/or the facility computing system 425 can be configured to output the one or more sensory cue(s) 445, 460. For example, the aerial computing system 45 can be configured to output one or more second sensory cues 460 and the facility computing system can be configured to output one or more first sensory cues 445. The operations computing system 405 can communicate first sensory data 420 indicative of the one or more first sensory cue(s) 445 to the facility computing system 425 and second sensory data 440 indicative of the one or more second sensory cue(s) 460 to the aerial computing system 450. For example, the operations computing system 405 can communicate data indicative of a first portion of the one or more sensor cue(s) to the facility computing system 425 and a second portion of the one or more sensor cue(s) to the aerial computing system 450. In this manner, the first portion of the one or more sensor cue(s) can be output from one or more output device(s) associated with the facility computing system 425 and the second portion of the one or more sensory cue(s) can be output from one or more output device(s) associated with the aerial computing system 450.

Figure 5:
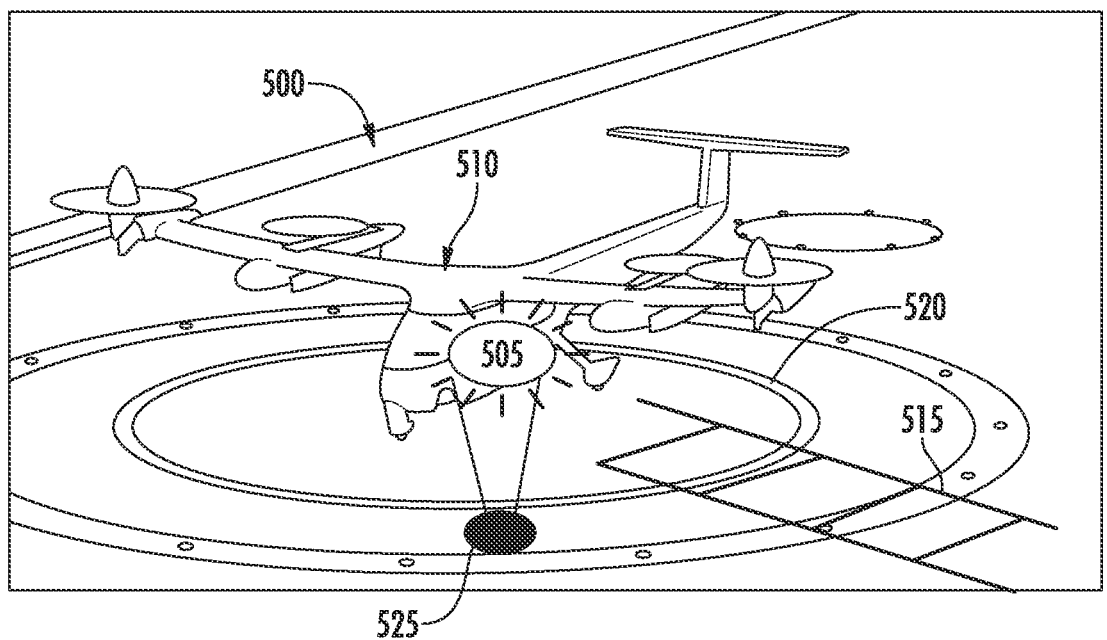
FIG. 5 depicts an example visual cue for a landing area of a facility according to example implementations of the present disclosure.

As an example, FIG. 5 depicts an example visual cue for a landing area 500 of a facility according to example implementations of the present disclosure. For example, the facility computing system (e.g., facility computing system 425) can be configured to output one or more visual cue(s) 505 on a surface of the aerial vehicle 510. By way of example, the one or more lighting device(s) can include one or more light projection device(s) 525 configured to project light onto one or more surface(s) of the vehicle. The facility computing system can utilize the one or more light projection device(s) 525 to project the one or more visual cue(s) 505 onto a surface of the aerial vehicle 510. In addition, or alternatively, the facility computing system can be configured to output the one or more visual cue(s) 515, 520 on a surface of the landing area 500 associated with the aerial facility. For example, the facility computing system can utilize the one or more light projection device(s) to project the one or more visual cue(s) 515, 520 onto the surface of the landing area. In addition, in some implementations, the facility computing system can include one or more landing area lighting device(s) configured to emit light from the landing area 500 and/or one or more landing area audio device(s) configured to produce sound from the landing area 500. The facility computing system can utilize the one or more landing area lighting device(s) and/or audio device(s) to output the one or more sensory cue(s) 505, 515, 520 identified by the sensory data at the landing area 500.

Figure 6:
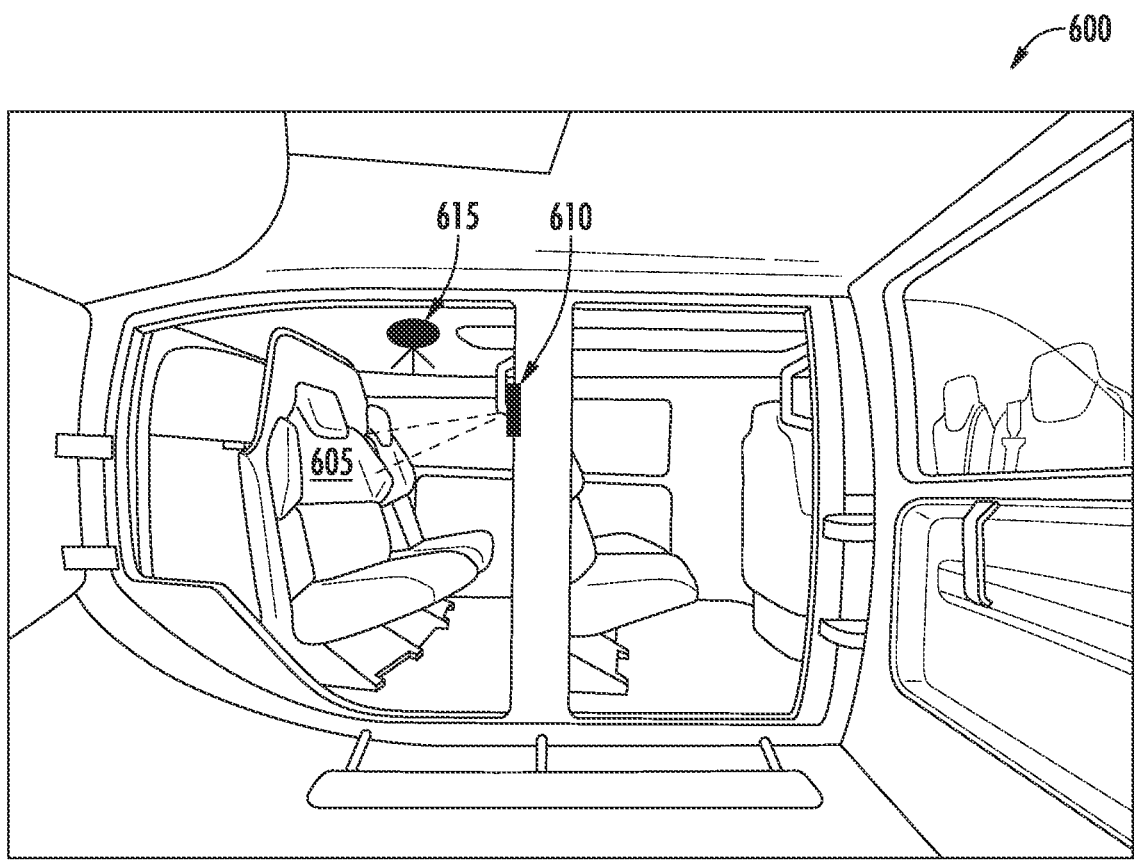
FIG. 6 depicts example visual cues for an aerial vehicle according to example implementations of the present disclosure.

As another example, FIG. 6 depicts example visual cues for an aerial vehicle 600 according to example implementations of the present disclosure. The aerial computing system (e.g., aerial computing system 450) can be configured to output one or more visual cue(s) 605 on a surface of the aerial vehicle 600. By way of example, the one or more lighting device(s) can include one or more light projection device(s) 610 configured to project light onto the one or more surface(s). The aerial computing system can utilize the one or more light projection device(s) 610 to project the one or more visual cue(s) 605 onto a surface of the aerial vehicle 600. For example, the aerial computing system can include one or more in-vehicle lighting device(s) 610 and/or audio device(s) 615 configured to emit light and/or sound from within the vehicle (e.g., from one or more doors, from a passenger seat, etc.). The aerial computing system can utilize the one or more in-vehicle lighting/audio device(s) 610, 615 to output the one or more sensory cue(s) 605 identified by the sensory data.

Figure 7:
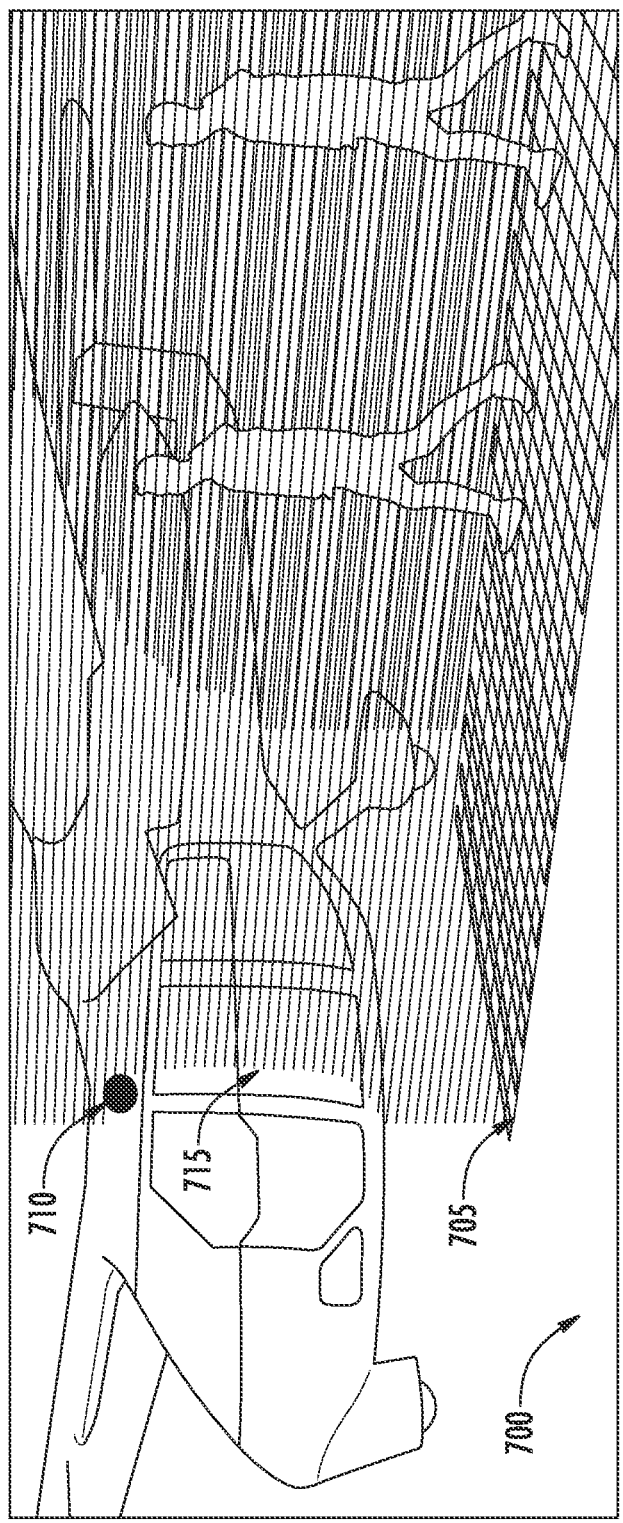
FIG. 7 depicts an example walling path for a landing area of a facility according to example implementations of the present disclosure.

In addition, or alternatively, with reference to FIG. 7, the aerial computing system can be configured to output one or more visual cue(s) 705, 715 on (and/or above) a surface of the landing area 700 associated with the aerial facility. For example, FIG. 7 depicts an example walling path 715 and walking path 705 for a landing area 700 of a facility according to example implementations of the present disclosure. As depicted, the aerial computing system can utilize one or more light projection device(s) 710 to project the one or more visual cue(s) 705 onto the surface of the landing area 700. In addition, or alternatively, the aerial computing system and/or facility computing system can utilize one or more vehicle light projection device(s) 710 and/or facility light projection device(s) to project the one or more visual cue(s) 715 above the surface of the landing area 700. The one or more visual cue(s) 715, for example, can form a walled path along a portion of the landing area 700. In this way, the visual cue(s) 715 can be outputted to generate a three-dimensional sensory cue for a user. By way of example, the aerial transport facility and/or aerial vehicle can include one or more output devices (e.g., aerial output device(s) 710, facility outputted device(s) 505, etc.) that can individually or collectively project a path (e.g., via sensory cue(s) 705) to the aerial vehicle with one or more light-projection walls (e.g., via sensory cue(s) 715). The light-projection walls (e.g., sensory cue(s) 715) can indicate the boundaries of the path (e.g., sensory cue(s) 705). The boundaries of the path can help designate the safe/permitted area for the users to travel (e.g., the area/volume inside the walls) and help designate the unsafe/prohibited area for the users to travel (e.g., the area/volume outside the walls).

Turning back to FIG. 4, the sensory data 420, 440 can be indicative of a plurality of sensory cues 445, 460. The sensory data 420, 440 can include timing data indicating a sensory cue sequence indicative of a time period to output each of the plurality of sensory cues. For example, the plurality of sensor cues can include one or more sensory cue(s) to be output on a schedule (e.g., based on one or more event(s), etc.). The facility and/or aerial computing system(s) 425, 450 can output the plurality of sensory cues 445, 460 in accordance with the schedule. For example, the sensory cue sequence can indicate that a first set of the plurality of sensory cues can be output for a first period of time (e.g., 5, 10, 15 minutes, etc.) and a second set of the plurality of the sensory cues can be output for a second period of time (e.g., 5, 10, 15 minutes) before/after/during the first period of time. The aerial and/or facility computing system(s) 425, 450 can output the first set of sensory cues during the first period of time and the second set of sensory cues during the second period of time.

By way of example, the aerial and/or facility computing system(s) 425, 450 (e.g., the computing system including devices physically located on the aerial vehicle, the computing system including devices physically located on the facility, etc.) can receive sensory data 420, 440 indicative of one or more temporary sensory cue(s). The sensory data 420, 440, for example, can include information for an aerial portion of a multi-modal transportation service (and/or an aerial vehicle inspection), conveyance instructions (e.g., sensory cue) indicative of a manner in which to convey the information, and temporal instructions (e.g., timing data) indicative of a time to output the information.

The aerial and/or facility computing system(s) 425, 450 can associate at least one of the one or more output device(s) with at least one temporary sensory cue based on the conveyance instructions. For example, the conveyance instructions can be indicative of one or more visual cue(s) and a location for the one or more visual cue(s). The aerial and/or facility computing system(s) 425, 450 can associate one or more lighting device(s) with the one or more visual cue(s) such that the one or more visual cue(s) can be output at the location indicated by the conveyance instructions. As another example, the conveyance instructions can be indicative of one or more audio cue(s) and a location for the one or more audio cue(s). The aerial and/or facility computing system(s) 425, 450 can associate one or more audio device(s) with the one or more audio cue(s) such that the one or more audio cue(s) can be output at the location indicated by the conveyance instructions.

The aerial and/or facility computing system(s) 425, 450 can output the at least one temporary sensory cue (e.g., via the at least one output device indicated by the conveyance instructions) based on the temporal instructions. For example, the temporal instructions can be indicative of the timing data indicating a time period to output each of the one or more temporary sensory cue(s). The aerial and/or facility computing system(s) 425, 450 can output the at least one temporary sensory cue during the time period associated with the at least one temporary sensory cue (e.g., as indicated by the temporal instructions). By way of example, the at least one temporary sensory cue can be indicative of a path along the landing area of the aerial facility to an aerial vehicle location on the landing area of the aerial facility. The aerial and/or facility computing system(s) 425, 450 can output the at least one sensory cue to one or more passenger(s) of the transportation service to indicate the path along the landing area of the aerial facility to the aerial vehicle located on the landing area of the aerial facility.

Figure 8:
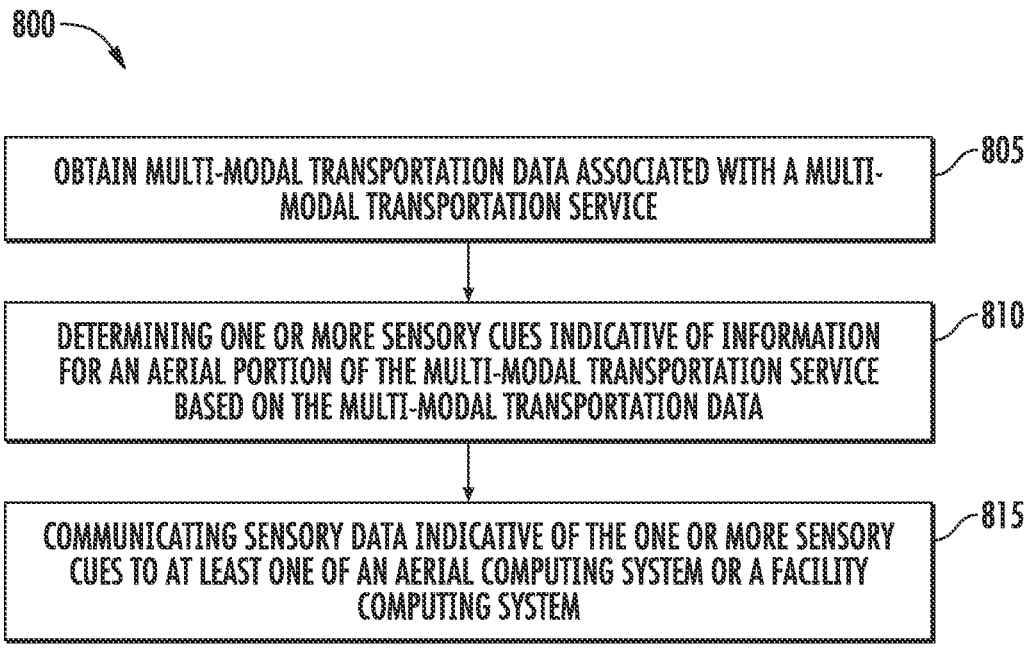
FIG. 8 depicts a flowchart diagram of an example method of determining one or more sensory cues according to example implementations of the present disclosure.

Turning to FIG. 8, FIG. 8 depicts a flowchart diagram of an example method 800 of determining one or more sensory cues according to example implementations of the present disclosure. One or more portion(s) of the method 800 can be implemented by a computing system that includes one or more computing devices such as, for example, the computing systems described with reference to the other figures (e.g., service entity computing system 102, operations computing system 405, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 3-7, 11, etc.), for example, to determine one or more sensory cues. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining multi-modal transportation data associated with a multi-modal transportation service. For example, a computing system (e.g., service entity computing system 102, operations computing system 405, etc.) can obtain the multi-modal transportation data associated with the multi-modal transportation service. The multi-modal transportation data can include aerial vehicle data and facility data associated with an aerial portion of the multi-modal transportation service. The aerial vehicle data can include one or more aerial characteristics of one or more aerial vehicle(s) associated with an aerial transportation service for the aerial portion of the multi-modal transportation service. The facility data can include one or more facility characteristics of a facility associated with the aerial transportation service.

At 810, the method 800 can include determining one or more sensory cues indicative of information for an aerial portion of the multi-modal transportation service based on the multi-modal transportation data. For example, the computing system (e.g., service entity computing system 102, operations computing system 405, etc.) can determine the one or more sensory cues indicative of information for the aerial portion of the multi-modal transportation service based on the multi-modal transportation data.

At 815, the method 800 can include communicating sensory data indicative of the one or more sensory cues to at least one of an aerial computing system or a facility computing system. For example, the computing system (e.g., service entity computing system 102, operations computing system 405, etc.) can communicate the sensory data indicative of the one or more sensory cues to the at least one of the facility computing system associated with the facility or the aerial computing system associated with an aerial vehicle of the one or more aerial vehicle(s).

Figure 9:
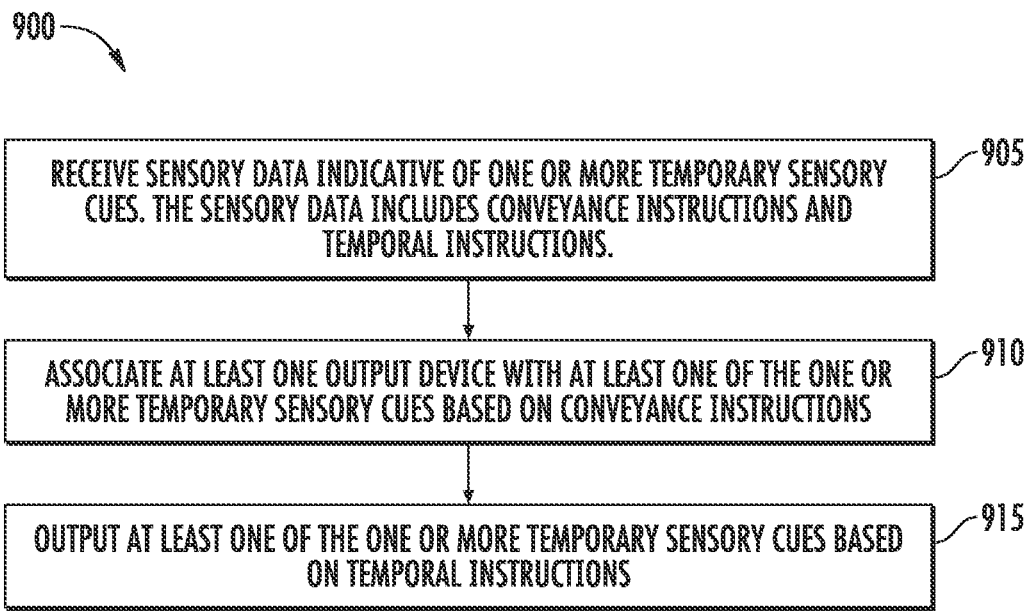
FIG. 9 depicts a flowchart diagram of an example method of outputting one or more sensory cues according to example implementations of the present disclosure.

Turning to FIG. 9, FIG. 9 depicts a flowchart diagram of an example method 900 of outputting one or more sensory cues according to example implementations of the present disclosure. One or more portion(s) of the method 900 can be implemented by a computing system that includes one or more computing devices such as, for example, the computing systems described with reference to the other figures (e.g., facility computing system(s) 140, aerial vehicle device(s) 190, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 3-7, 11, etc.), for example, to output one or more sensory cues. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 can include receiving sensory data indicative of one or more temporary sensory cues. For example, a computing system (e.g., facility computing system(s) 140, aerial vehicle device(s) 190, etc.) can receive sensory data indicative of the one or more temporary sensory cues. The sensory data can include information for an aerial portion of a multi-modal transportation service, conveyance instructions indicative of a manner in which to convey the information, and temporal instructions indicative of a time to output the information.

At 910, the method 900 can include associating at least one output device with at least one of the one or more temporary sensory cues based on conveyance instructions. For example, the computing system (e.g., facility computing system(s) 140, aerial vehicle device(s) 190, etc.) can associate at least one output device with at least one of the one or more temporary sensory cues based on the conveyance instructions.

At 915, the method 900 can include outputting the at least one of the one or more temporary sensory cues based on temporal instructions. For example, the computing system (e.g., facility computing system(s) 140, aerial vehicle device(s) 190, etc.) can output the at least one temporary sensory cue, via the at least one output device, based, at least in part, on the temporal instructions. The at least one temporary sensory cue can be output to one or more passengers of the transportation service to indicate a path along a landing area of an aerial facility to an aerial vehicle located on the landing area of the aerial facility.

FIG. 10 depicts example system 1000 components according to example embodiments of the present disclosure. The example system 1000 can include the computing system 1005 (e.g., service entity computing system 102, operations computing system 405, etc.) and the computing system(s) 1050 (e.g., aerial vehicle devices 190, facility computing system(s) 140, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions for which the computing system is configured, as described herein.

The memory 1020 can store data 1030 that can be obtained, received, accessed, written, manipulated, created, and/or stored. The data 1030 can include, for instance, sensory data, multi-modal transportation data, and/or other data/information described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, sensory data, multi-modal transportation data, and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a satellite network, local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at a transportation services system, the simulation computing system, etc. can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising:
one or more processors; and
one or more memory devices, the one or more memory devices storing instructions that when executed by the one or more processors cause the computing system to perform operations, the operations comprising:
accessing facility data associated with an aerial facility, wherein the facility data is indicative of a physical layout of the aerial facility and locations of a plurality of aircraft that are currently located, or are planned to be located, within a landing area of the aerial facility;
accessing vehicle data indicative of physical dimensions for each of the plurality of aircraft;
based on the facility data and the vehicle data, computing a temporary path on the landing area that extends between an aircraft assigned to transport a passenger and an aerial facility in order to lead the passenger through the landing area to or from the aircraft,
wherein the temporary path is computed based on the physical layout of the aerial facility, the locations of the plurality of aircraft within the landing area at a time the passenger is to board or depart the assigned aircraft, and the physical dimensions of the plurality of aircraft such that the temporary path extends across the landing area of the aerial facility and provides a buffer distance between the passenger and the plurality of aircraft that are currently located, or planned to be located, within the landing area at the time the passenger is to board or depart the assigned aircraft;
computing one or more sensory cues for projection at the landing area, wherein the sensory cues comprise at least one of a visual cue or a sound for guiding the passenger along the temporary path within the landing area; and
activating one or more output devices for the one or more sensory cues at the landing area in order to indicate the temporary path for the passenger at the landing area.

2. The computing system of claim 1, wherein the operations further comprise accessing data indicative of flight itineraries for a plurality of aircraft.

3. The computing system of claim 2, wherein the physical layout of the aerial facility comprises a physical layout of the landing area of the aerial facility.

4. The computing system of claim 2, wherein the vehicle data further comprises data indicative of a vehicle type and a vehicle status associated with each of the plurality of aircraft.

5. The computing system of claim 1, wherein the plurality of aircraft comprises a plurality of different types of aircraft.

6. The computing system of claim 1, wherein communicating the data indicative of the one or more of sensory cues comprises:
communicating the data indicative of the one or more of sensory cues to a facility computing system, wherein the facility computing system is configured to output the one or more sensory cues via the one or more output devices positioned at the landing area and associated with the facility computing system.

7. The computing system of claim 1, wherein the sound comprises a directional audio for directing the passenger along the temporary path within the landing area of the facility.

8. The computing system of claim 1, wherein the visual cue comprises a color indicative of information for the passenger.

9. The computing system of claim 1, wherein the visual cue comprises an activation pattern of a plurality of lights projected on the landing area of the aerial facility.

10. The computing system of claim 1, wherein the aerial facility comprises one or more lighting devices positioned at the landing area and a facility computing system configured to output the visual cue via the one or more lighting devices.

11. The computing system of claim 1, wherein the operations further comprise accessing passenger data indicative of one or more passenger characteristics associated with the passenger, and
wherein the one or more passenger characteristics comprise data indicative of a passenger name, passenger itinerary information, or a seat assignment for the assigned aircraft.

12. The computing system of claim 11, wherein at least one of the one or more sensory cues are indicative of at least one of the one or more passenger characteristics.

13. The computing system of claim 1, wherein the operations further comprise accessing environmental data indicative of one or more atmospheric or lighting conditions associated with a current environment of the aerial facility.

14. A computer implemented method comprising:
accessing facility data associated with an aerial facility, wherein the facility data is indicative of a physical layout of the aerial facility and locations of a plurality of aircraft that are currently located, or are planned to be located, within a landing area of the aerial facility;
accessing vehicle data indicative of physical dimensions for each of the plurality of aircraft;
based on the facility data and the vehicle data, computing a temporary path on the landing area that extends between an aircraft assigned to transport a passenger and an aerial facility in order to lead the passenger through the landing area to or from an aircraft,
wherein the temporary path is computed based on the physical layout of the aerial facility, the locations of the plurality of aircraft within the landing area at a time the passenger is to board or depart the assigned aircraft, and the physical dimensions of the plurality of aircraft such that the temporary path extends across the landing area of the aerial facility and provides a buffer distance between the passenger and the plurality of aircraft that are currently located, or planned to be located, within the landing area at the time the passenger is to board or depart the assigned aircraft;
computing one or more sensory cues for projection at the landing area, wherein the sensory cues comprise at least one of a visual cue or a sound for guiding the passenger along the temporary path within the landing area; and
activating one or more output devices for the one or more sensory cues at the landing area in order to indicate the temporary path for the passenger at the landing area.

15. The computer-implemented method of claim 14, further comprising:
determining timing data for each respective sensory cue of the one or more sensory cues, wherein the timing data is indicative of a time period to output the respective sensory cue.

16. The computer-implemented method of claim 15, wherein the timing data is determined based on one or more events associated with an aerial portion of a multi-modal transportation service for the passenger.

17. The computer-implemented method of claim 15, wherein the data indicative of the one or more sensory cues comprises a sensory cue sequence indicative of a time period to output each of the plurality of sensory cues.

18. A computing system comprising:
   one or more output devices comprising at least one visual output device or audio output device, the one or more output devices positioned at a landing area, the one or more output devices configured for outputting one or more sensory cues at the landing area;
   one or more processors; and
   one or more memory devices, the one or more memory devices storing instructions that when executed by the one or more processors cause the computing system to perform operations, the operations comprising:
      accessing data indicative of the one or more sensory cues for output at an aerial facility to indicate a temporary path for a passenger through the landing area of the aerial facility to or from an aircraft assigned to transport the passenger;
      wherein the temporary path is based on a physical layout of the aerial facility, locations of a plurality of aircraft within the landing area of the aerial facility at a time the passenger is to board or depart the assigned aircraft, and physical dimensions of the plurality of aircraft such that the temporary path extends across the landing area of the aerial facility and provides a buffer distance between the passenger and the plurality of aircraft that are currently located, or planned to be located, within the landing area at the time the passenger is to board or depart the assigned aircraft;
      determining at least one of the one or more output devices for at least one of the one or more sensory cues; and
      activating the at least one output device in order to project the at least one sensory cue at the landing area, wherein the at least one sensory cue indicates the temporary path through the landing area of the aerial facility.

19. The computing system of claim 18, wherein the computing system comprises one or more computing devices physically located at the aerial facility.

20. The computing system of claim 18, wherein the temporary path is indicative of a first portion of the landing area in which the passenger is to travel within the landing area and a second portion of the landing area in which the passenger is not to travel within the landing area.

21. The computing system of claim 1, wherein activating the one or more output devices for the one or more sensory cues at the landing area comprises communicating data indicative of the one or more sensory cues for projection at the landing area via the one or more output devices.

22. The computer-implemented method of claim 14, activating the one or more output devices for the one or more sensory cues at the landing area comprises communicating data indicative of the one or more sensory cues for projection at the landing area via the one or more output devices.

* * * * *